(12) United States Patent
Roth et al.

(10) Patent No.: US 8,393,577 B2
(45) Date of Patent: Mar. 12, 2013

(54) DECOMPRESSION DEVICE FOR AN AIRCRAFT

(76) Inventors: Ingo Roth, Hamburg (DE); Timo Philipp Heidorn, Hamburg (DE)

( * ) Notice: Subject to any disclaimer, the term of this patent is extended or adjusted under 35 U.S.C. 154(b) by 223 days.

(21) Appl. No.: 12/818,625

(22) Filed: Jun. 18, 2010

(65) Prior Publication Data

US 2010/0320318 A1    Dec. 23, 2010

Related U.S. Application Data

(60) Provisional application No. 61/218,120, filed on Jun. 18, 2009.

(30) Foreign Application Priority Data

Jun. 18, 2009  (DE) .......................... 10 2009 025 382

(51) Int. Cl.
 *B64C 1/14* (2006.01)
(52) U.S. Cl. .................................. 244/129.5; 244/118.5
(58) Field of Classification Search ............... 244/129.4, 244/129.5, 129.1, 118.5; 49/31
See application file for complete search history.

(56) References Cited

U.S. PATENT DOCUMENTS

| 4,646,993 A | 3/1987 | Baetke | |
| RE32,554 E * | 12/1987 | Murphy | 244/118.5 |
| 7,568,659 B2 * | 8/2009 | Roques et al. | 244/121 |
| 7,896,290 B2 * | 3/2011 | Saku et al. | 244/129.5 |
| 2003/0168553 A1 | 9/2003 | Diehl et al. | |
| 2008/0111025 A1 * | 5/2008 | Saku et al. | 244/129.5 |
| 2010/0187358 A1 | 7/2010 | Voss et al. | |

FOREIGN PATENT DOCUMENTS

| DE | 10031714 | 1/2002 |
| DE | 102004009017 | 8/2005 |
| DE | 102009006395 | 7/2010 |
| DE | 10 2009 012 015 | 9/2010 |
| DE | 10 2009 012 015.7 | 9/2010 |
| WO | 2007073787 | 7/2007 |

* cited by examiner

*Primary Examiner* — Joseph W Sanderson
*Assistant Examiner* — Brian M O'Hara
(74) *Attorney, Agent, or Firm* — Wood, Herron & Evans, LLP

(57) ABSTRACT

A decompression device for an aircraft includes a cabin lining element, which has a first aperture for discharging exhaust air in normal operation of the aircraft and a second aperture for discharging a decompression air flow. The device also includes an unlockable closure element, which is fixable in a closing position in such a way that the second aperture is closed for air flow, and which after unlocking, can take a releasing position so that the second aperture is opened for air flow. The device also includes a locking device designed to fix the closure element in normal operation of the aircraft in the closing position, and is designed in the case of decompression to release the fixing of the closure element, so that the closure element can take the releasing position.

5 Claims, 17 Drawing Sheets

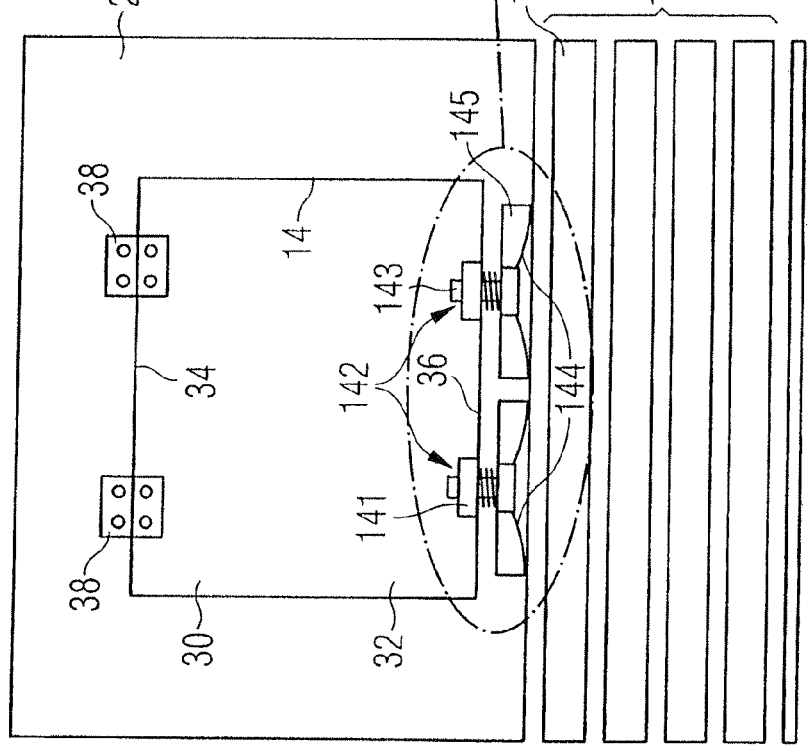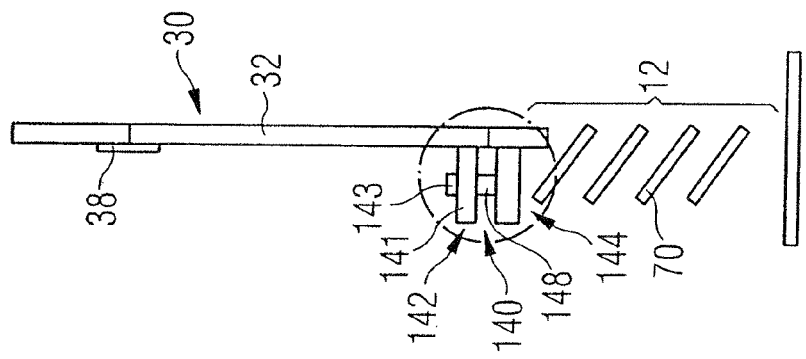

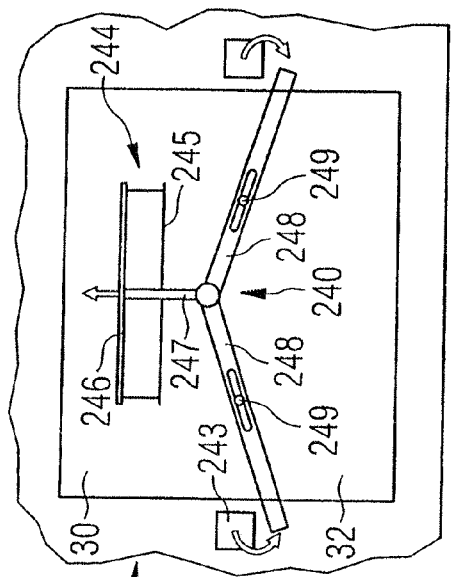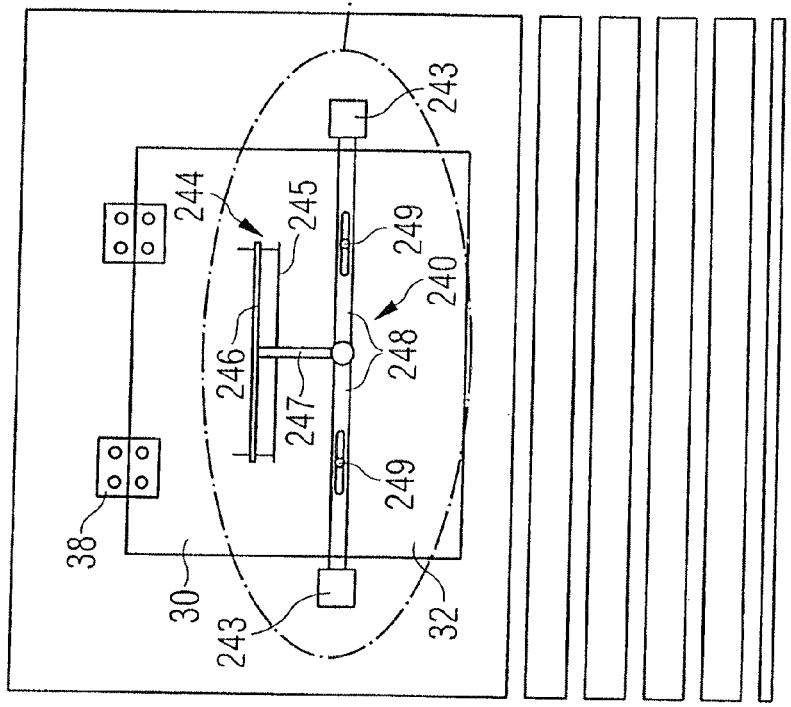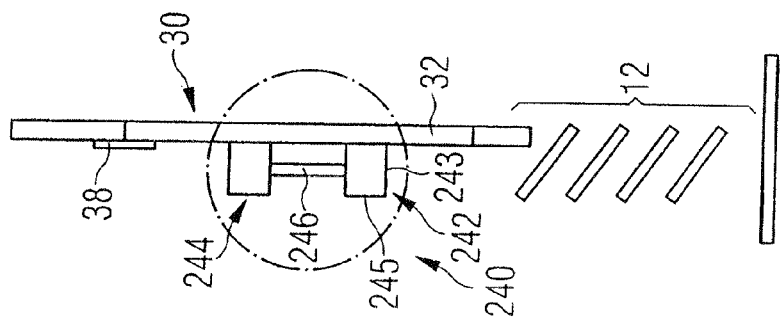

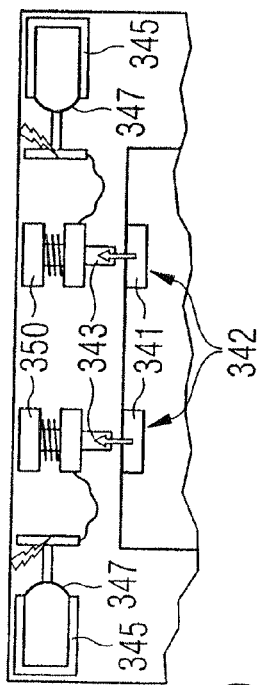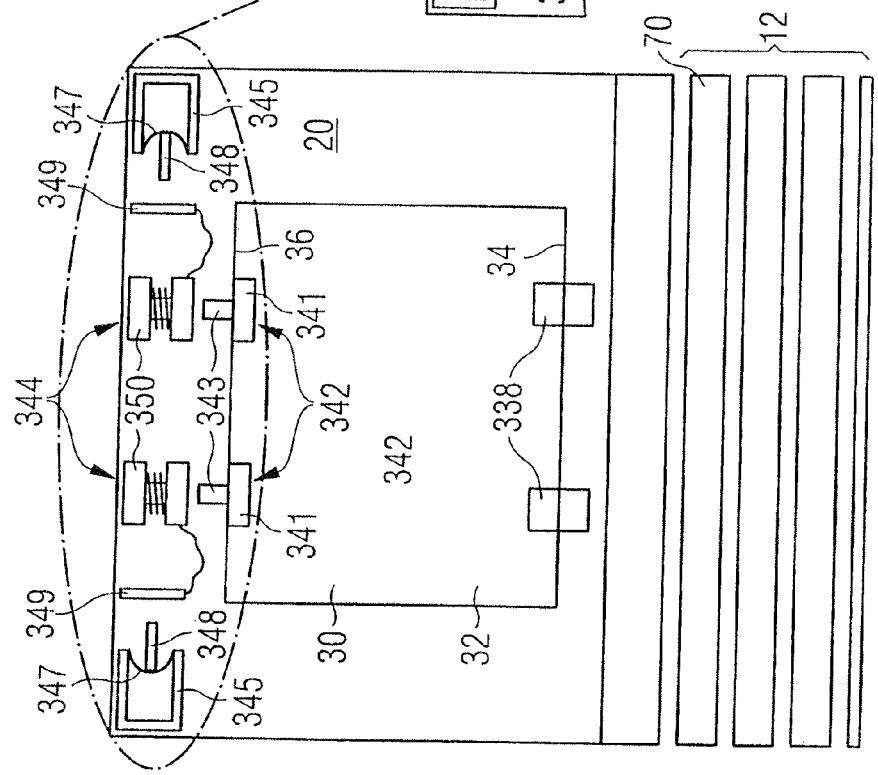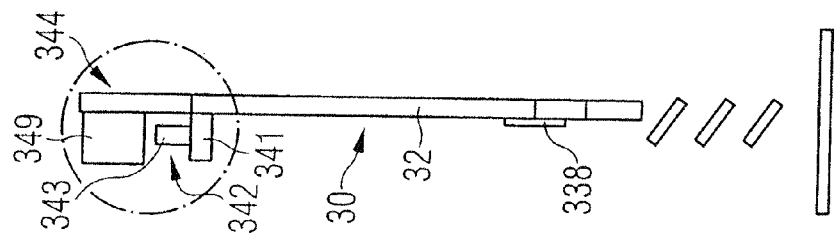

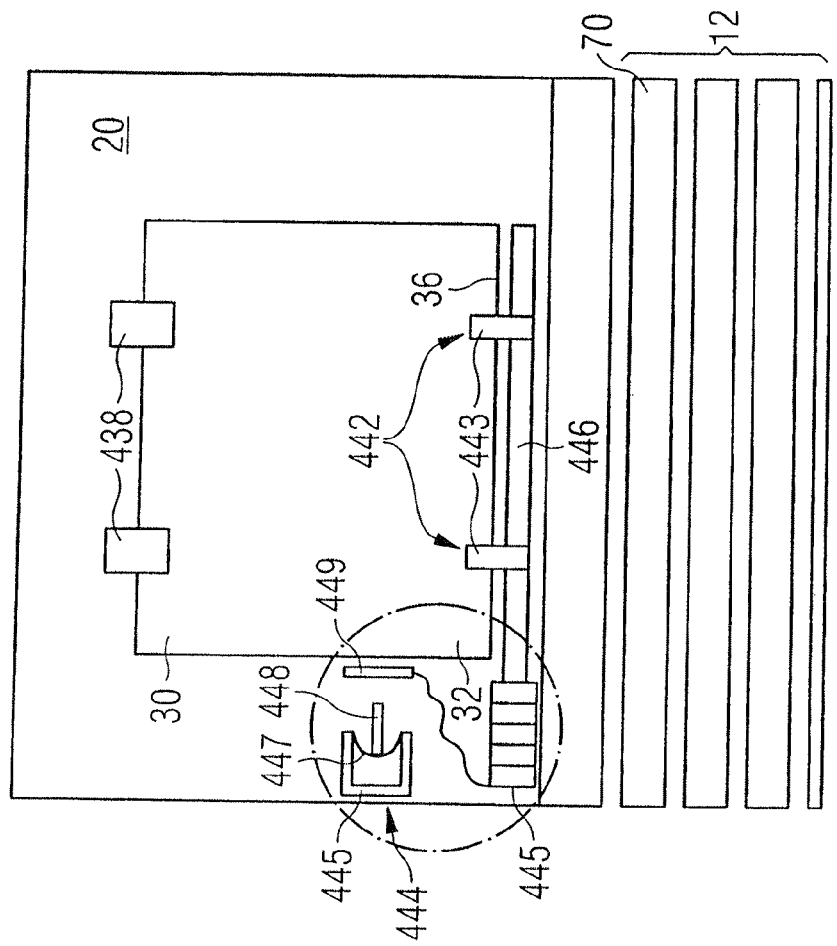
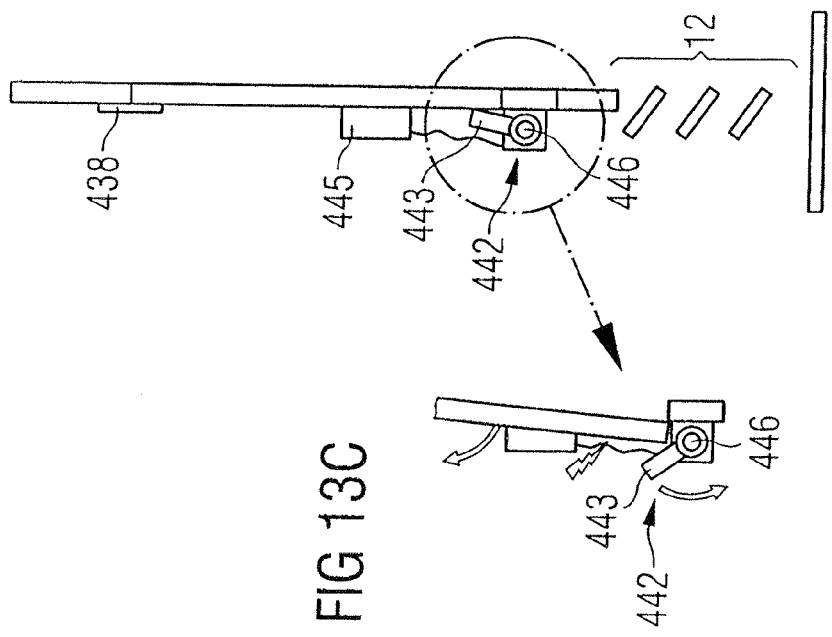

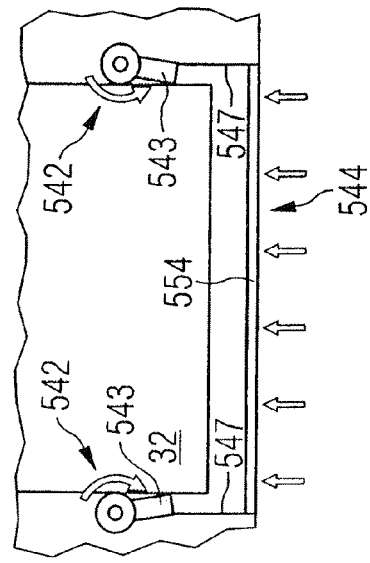
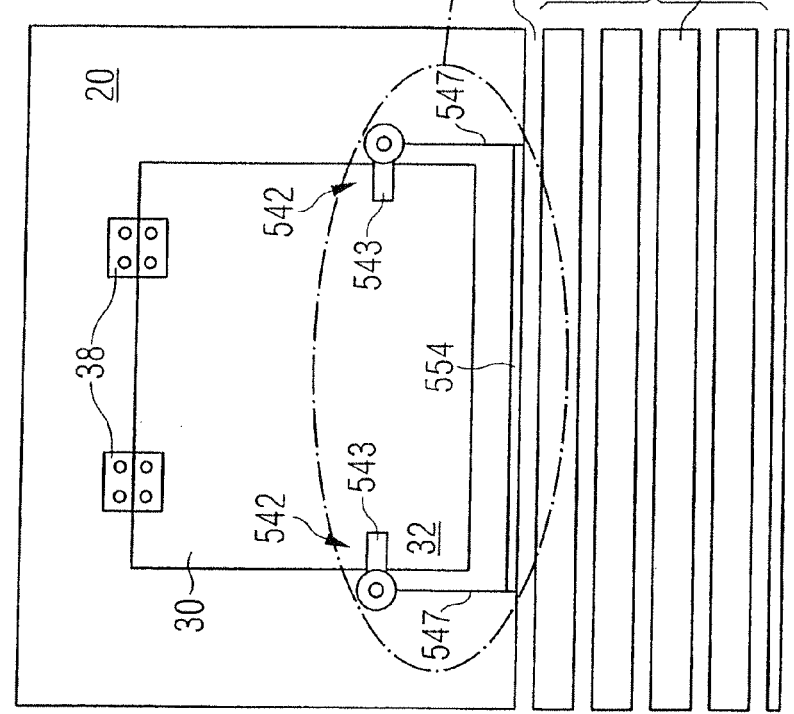
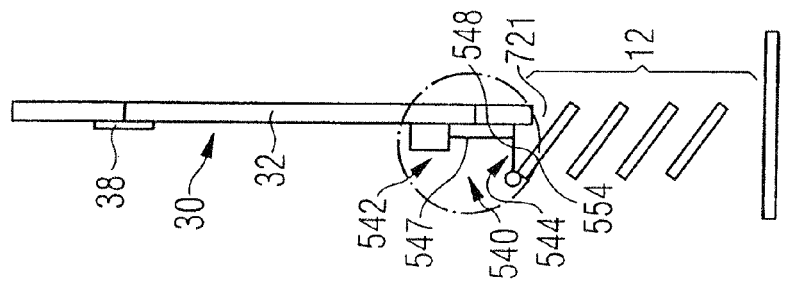

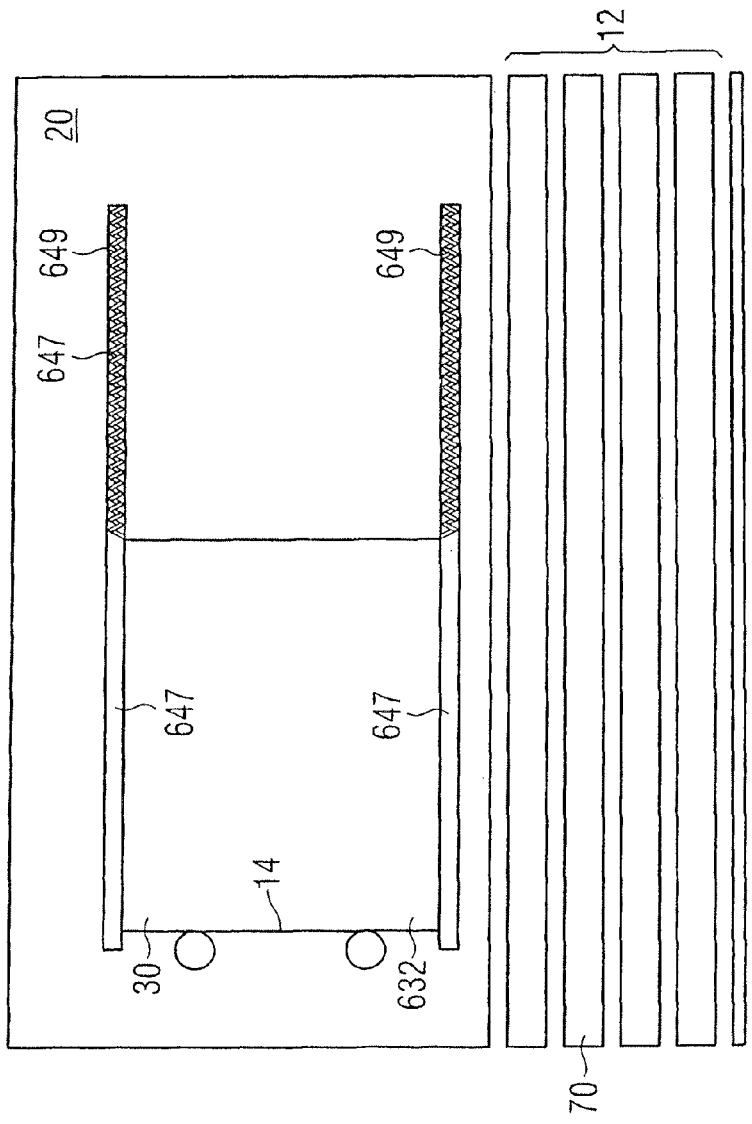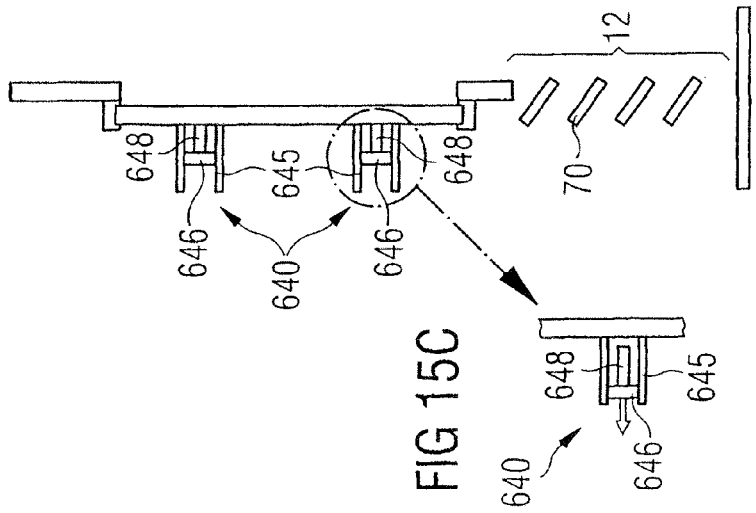

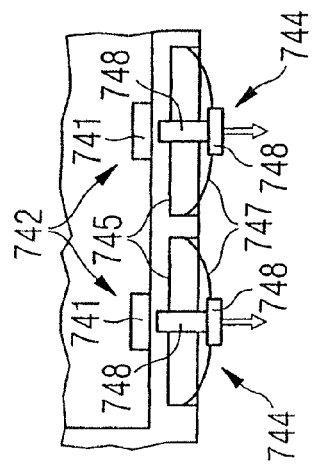
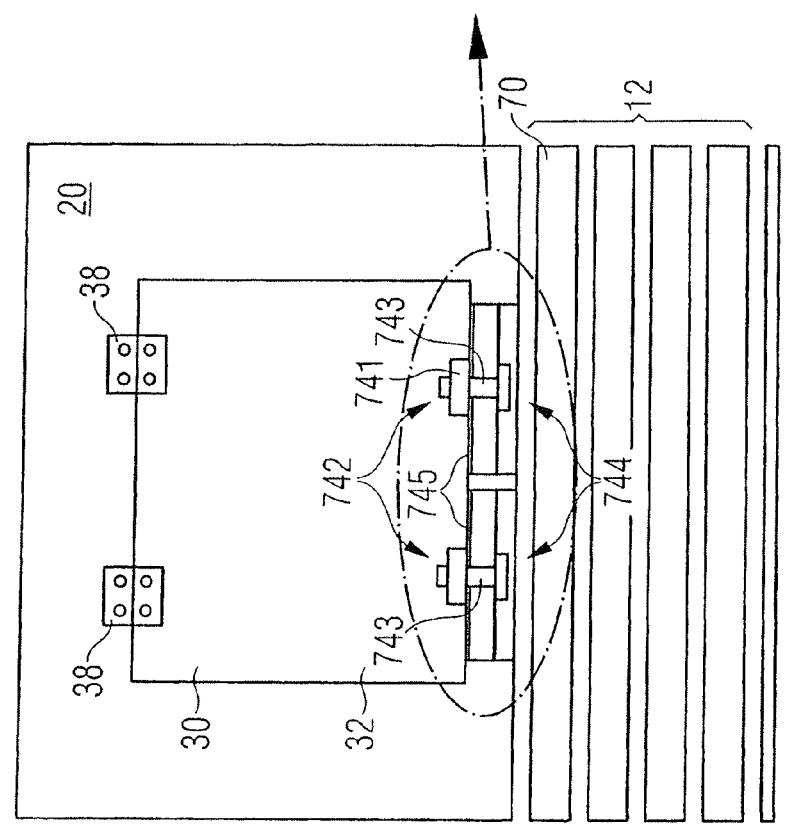
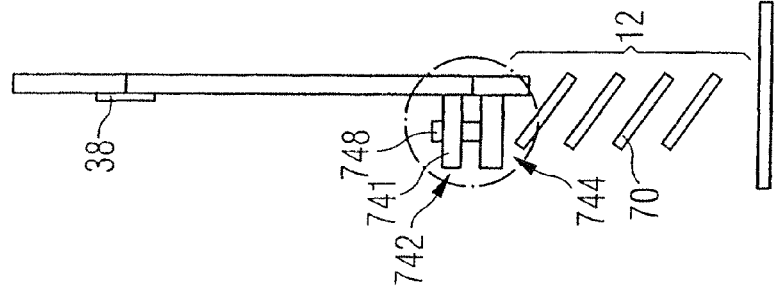

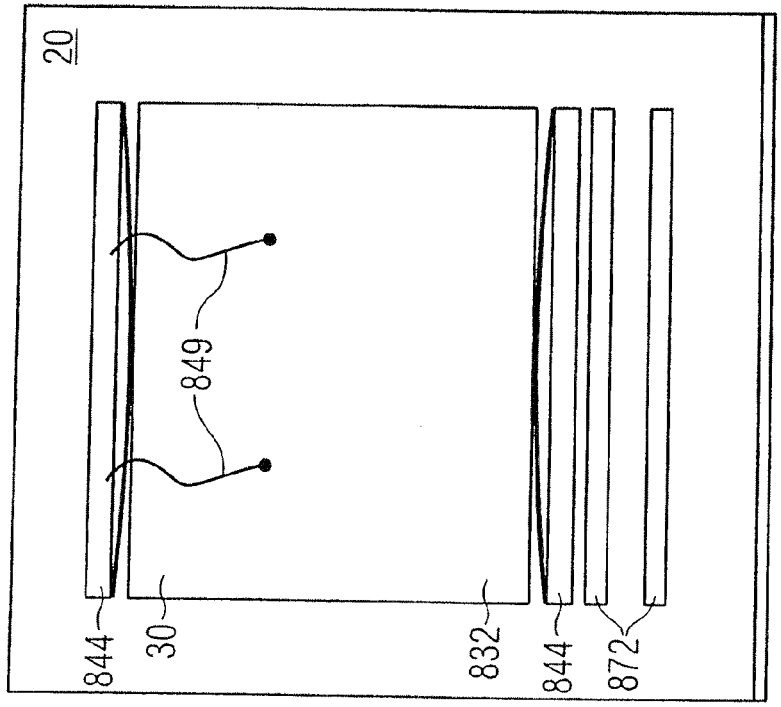
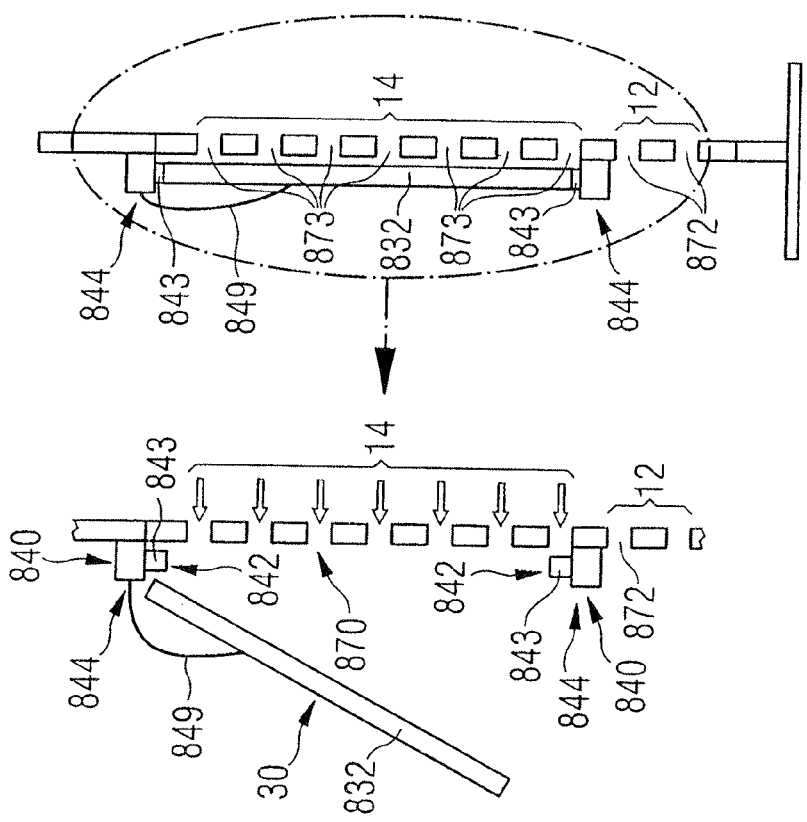
FIG 17A
FIG 17B
FIG 17C

DECOMPRESSION DEVICE FOR AN AIRCRAFT

This application claims priority to U.S. Provisional Patent Application No. 61/218,120 filed on Jun. 18, 2009; and/or to German Patent Application No. 102009025382.3, filed on Jun. 18, 2009.

TECHNICAL FIELD

The invention concerns a decompression device, which is provided for use in an aircraft, e.g. a passenger aircraft.

BACKGROUND

Passenger aircraft which are used at present include a pressurized cabin, the internal pressure of which in flight operation is kept at an increased pressure level compared with the ambient pressure, i.e. the reduced atmospheric pressure at great height, e.g. by an air-conditioning system which is fed with air tapped from the engine. In general, the pressure within the cabin of a passenger aircraft in flight operation of the aircraft, i.e. if the aircraft is at cruising altitude, usually corresponds approximately to the atmospheric pressure at a height of 8000 feet (about 2400 m). The conditioned air provided by the aircraft air-conditioning system is usually fed into the cabin through air inlet ducts, which open into the cabin above the passenger seats in the region of ceiling lining panels and/or side lining panels of the cabin lining. Exhaust air is usually discharged from the cabin through air outlet ducts, which are arranged in the region of a cabin floor or a section of the side lining panels near the floor. In the case of decompression, i.e. in the case of a pressure loss in a region of the aircraft cabin which is kept at increased pressure during flight, to prevent damage to the cabin lining, in particular to the side lining panels, in the case of decompression a pressure equalization must be possible between the region of the aircraft interior affected by the decompression and a region which is delimited by the panels, in particular the side lining panels of the cabin lining, and the outer skin of the aircraft.

To make pressure equalisation possible in the case of decompression, in the unpublished German patent application DE 10 2009 012 015.7, a decompression arrangement for an aircraft was proposed, comprising: a first cabin lining element with an edge region, a second cabin lining element with an edge region, the edge region of the second cabin lining element being arranged at a smaller distance from an aircraft outer skin than the edge region of the first cabin lining element, an air removal aperture between the edge region of the first cabin lining element and the edge region of the second cabin lining element for discharging air from the cabin of the aircraft into the region of the aircraft between the cabin lining elements and the aircraft outer skin, and a decompression element, which is set up to, in the case of decompression, release a pressure equalisation aperture between the cabin of the aircraft and the region of the aircraft between the cabin lining elements and the aircraft outer skin, and which is arranged in a region of the aircraft which is screened by the first and/or second cabin lining element from an interior of the cabin of the aircraft. Disadvantages of this compression arrangement are that a first and a second, and thus not a one-piece or integrated, cabin lining element is provided, and that the air removal aperture, which is arranged between the edge region of the first cabin lining element and the edge region of the second cabin lining element, including the releasable pressure equalisation aperture, cannot be made arbitrarily large.

Furthermore, in modern aircraft a decompression arrangement is used, in which a side lining panel of the cabin lining has in its lower region, the so-called foot lining, an aperture through which used air from the aircraft cabin can flow into the region between the cabin lining and the aircraft outer skin. This aperture is covered by a flap system, which for a passenger on the cabin side is visible as apparently one covering flap. The flap system has a flap (covering flap) which is arranged on the cabin side and is in one piece, and a flap which is at the rear seen from the cabin, and consists of two flap elements which are held together in their position by a spring sheet.

In normal operation of the aircraft, i.e. when the air removal aperture is used to discharge used air from the cabin of the aircraft, the two flap elements of the rear flap are substantially arranged in one plane, parallel and at a distance from the cabin-side, one-piece flap, so that between the cabin-side flap and the flap elements the air removal aperture for discharging used air from the cabin is formed. In the case of decompression, the flap system as a whole, as seen from the cabin, pivots outward, in which case the two flap elements of the rear flap buckle along the spring sheet on the principle of a knee lever, thereby releasing a fixation of the flap system, so that the latter can pivot as a whole and thus open the aperture. A disadvantage of this known decompression arrangement is the relatively complicated construction of the flap system. Another disadvantage is that here too the air removal aperture cannot be made arbitrarily large.

There is a need to overcome or reduce the disadvantages of the known decompression arrangements. An object on which the invention is based is to provide a decompression arrangement with a simpler construction.

SUMMARY

This object is achieved by a decompression device for an aircraft according to the following description. The decompression device includes a cabin lining element, which has a first aperture, an aperture surface of the first aperture being dimensioned so that in normal operation of the aircraft an exhaust air flow portion, which is associated with the cabin lining element, of a total exhaust air flow from a cabin of the aircraft can flow through the first aperture.

According to the invention, the cabin lining element has a second aperture, an aperture surface of the second aperture being dimensioned so that in a case of decompression a decompression air flow portion, which is associated with the cabin lining element, of a total decompression air flow from the cabin of the aircraft flows through the first and second apertures. The device also includes an unlockable and detachable closure element, which is designed to unlockably close the second aperture, it being possible to arrange said element detachably in a closing position on or in the second aperture so that the second aperture is closed, and said element, after unlocking, being able to take a releasing position which is different from the closing position, so that the second aperture is opened, and an unlockable locking device, which is designed to fix the closure element in normal operation of the aircraft in its closing position on or in the second aperture, and in the case of decompression to release the fixing of the closure element, so that the closure element can take its releasing position.

An advantage of the proposed decompression device is that it comprises only one cabin lining element, which in particular can be in one-piece form, and which can be pre-assembled as a whole and then installed in the aircraft. A further advantage is that both the first aperture, which is used as the air removal aperture for normal operation of the aircraft, and the second aperture, which is used as an additional pressure equalisation aperture for the case of decompression, can be made almost arbitrarily large.

With the compression device, in normal operation of the aircraft the exhaust air flow portion through the cabin lining element is determined by the difference between a preset pressure on the cabin side and a corresponding pressure in a region between the rear of the cabin lining element and the aircraft outer skin. In the case of decompression, the decompression air flow portion through the first and second apertures is determined by a pressure difference, which prevails in the case of decompression, between the pressure on the cabin side and the pressure in the region between the rear of the cabin lining element and the aircraft outer skin.

The closure element can include a pivotable closure flap. The closure flap can have a first edge, and be hinged pivotably along its first edge at an edge region of the cabin lining element adjacent to the second aperture. The closure flap can also be in such a form that in the case of unlocking it can pivot between its closing position and its releasing position. A mechanically relatively simple design of the closure element is thus possible.

The closure flap can include a second edge, which is opposite the first edge. In normal operation of the aircraft, the locking device can act at least on a sub-region of the second edge of the closure flap, and fix it in its closing position. Such a version is easy to implement, and makes reliable locking of the closure element possible.

The first aperture can be covered by a lamellar grid arrangement. The lamellar grid arrangement can divide the first aperture into a plurality of sub-apertures. The lamellar grid arrangement protects those elements of the decompression device which as seen from the cabin are behind the cabin lining element, such as the locking device, from misuse loads such as footsteps.

The locking device can include the following: a latching device, which in normal operation of the aircraft takes a fixing position, by which the closure element is fixed in its closing position, and which in the case of decompression takes a triggering position, by which the fixing of the closure element is released. The locking device can also include a triggering device, which in normal operation of the aircraft takes a fixing state, and which is in such a form that it interacts with the latching device in such a way that the latching device, in normal operation of the aircraft, takes its fixing state, in which the latching device takes its fixing position, and which in the case of decompression takes a triggering state, by which the latching device is transferred to its triggering position. Such a latching device provides secure, reliable locking of the closure element in normal operation of the aircraft, i.e. the closure element is not detached inadvertently or in operating conditions which do not correspond to the case of decompression. Such a triggering device makes reliable triggering and unlocking of the latching device possible.

In a preferred first embodiment, the triggering device includes a pivotable triggering element, which is pivotable between a fixing position corresponding to its fixing state and a triggering position corresponding to its triggering state, the difference between the pressure in the cabin and the pressure in the region between the rear of the cabin lining element and the aircraft outer skin, or an air flow driven by this pressure difference, acting on the triggering element, and the triggering element being in such a form that when the case of decompression occurs, in particular if the pressure difference exceeds a predetermined threshold value or the air flow exceeds a predetermined threshold flow value, it pivots into its triggering position. This pivotable triggering element can have a relatively simple design, and makes possible reliable unlocking of the closure element, driven directly by the decompression air flow.

In normal operation of the aircraft, an exhaust air flow portion which flows through the first aperture can flow onto at least a sub-region of the pivotable triggering element. This makes triggering controlled directly by the air flow possible, without a further triggering control device, which may possibly cause a time delay in the triggering, being necessary.

The triggering device, in particular the triggering element, in normal operation of the aircraft can be biased by an elastic means in a fixing position corresponding to its fixing state. In normal operation of the aircraft, the elastic means makes reliable fixing of the triggering device possible.

Still according to the preferred first embodiment, the latching device can include an angle section with a substantially L-shaped profile in cross-section. The angle section can have a first leg region, a second leg region and an axis of rotation, the axis of rotation running in a region where the first and second leg regions meet, or in a region which is adjacent to this region. The angle section can be pivotable around its axis of rotation between a locking position and a releasing position. In normal operation of the aircraft, the first leg region of the angle section can act at least on a sub-region of an edge region of the closure flap, said edge region extending along the second edge of the closure flap. Finally, the triggering device can interact with the second leg region of the latching device. Such a latching device is subject to a simple, purely mechanical working principle, and makes possible a mechanically simple design and thus a possible weight saving compared with more complex embodiments of the latching device, such as described below.

In a second embodiment, the closure element can include a movably carried closure plate, the closure plate being slidably arranged by means of two guide rails which are fixed to the cabin lining element, and in the case of unlocking is slidable between its closing position and its releasing position. This version of the closure element requires only a small fitting space, in particular because no pivoting region for the closure plate is required, and in the case of decompression makes complete release of the second aperture possible.

The guide rails are advantageously provided on the rear of the cabin lining element, i.e. the side which does not face the cabin. They are thus invisible from the cabin side, and make an aesthetic or optically inconspicuous appearance of the decompression device possible.

This movably carried closure plate can be biased in its closing position by a spring means in the direction of the releasing position. Also, in normal operation of the aircraft, the closure plate can be fixed in its closing position by an actuatable latching means. In the case of decompression, the biasing spring means makes possible reliable opening of the second aperture, and upon interacting with the actuatable latching means, reliable triggering by actuation of the latching means.

In a third embodiment, the closure element can be a closure plate, which in normal operation of the aircraft is fixed in its closing position by at least two attaching means which are fixed to the cabin lining element and can be actuated. The attaching means can be in such a form that in the case of compression it can release the fixing of the closure plate, so that the closure plate can substantially detach itself completely from the cabin lining element. This version of the closure element also requires only a small fitting space, because no pivoting region is required, and also in the case of decompression makes complete opening of the second aperture possible.

The attaching means can include at least one check strap, which has a first end, which is fixed to the closure flap, and a second end, which is fixed to the rear of the cabin lining element. The effect of the check strap is that a completely released closure plate remains near the second aperture, i.e. in the range of the length of the check strap, and thus is easy to find even after being triggered.

In further embodiments, the triggering device can be selected from a group which includes the following alternatives (1) to (3):
(1) In a fourth embodiment, the triggering device includes a volume reservoir with a membrane or a flexible plastic film and an actuating element, the membrane or flexible plastic film sealing the volume reservoir and being in such a form that in the case of decompression, i.e. in the case of a rapid pressure loss in the environment of the volume reservoir, it bulges outward, the actuating element interacting with the membrane or flexible plastic film in such a way that it is transferred by the bulging membrane or plastic film from a normal position corresponding to its fixing state into a triggering position corresponding to its triggering state.
(2) In a fifth embodiment of the decompression device, the triggering device includes at least one volume reservoir with a movable plate and an actuating element, the movable plate sealing the volume reservoir and being in such a form that in the case of decompression, i.e. in the case of a rapid pressure loss in the environment of the volume reservoir, it moves outward, the actuating element interacting with the movable plate in such a way that it is transferred by the moving plate from a normal position corresponding to its fixing state into a triggering position corresponding to its triggering state.
(3) In a sixth embodiment of the decompression device, the triggering device includes at least one cylinder with a movable piston and an actuating element, the movable piston sealing the cylinder and being in such a form that in the case of decompression, i.e. in the case of a rapid pressure loss in the environment of the piston, it moves outward, the actuating element interacting with the movable piston in such a way that it is transferred by the moving piston from a normal position corresponding to its fixing state into a triggering position corresponding to its triggering state.

With the fourth to sixth embodiments, triggering devices in various forms are provided, and can be chosen according to desired requirements of an application case.

The triggering device can also include an electrical contact switch, which is in such a form that it interacts with the actuating element so that when the actuating element is transferred from its normal position into its triggering position, it is switched from a normal state, e.g. an electrically non-conducting state, into a triggering state, e.g. an electrically conducting state. The contact switch makes possible very sensitive triggering, which as required can be set or designed to be more sensitive than is possible in the case of mechanical triggering devices.

In further versions, the triggering device can also include a module which is chosen from a group including the following variants (i) and (ii):
(i) In a seventh embodiment, the module includes at least one activatable electromagnet, the electromagnet interacting with the electrical contact switch in such a way that the electromagnet is activated when the contact switch is switched into its triggering state, the latching device including a linearly movable latching element with a fixing position and a triggering position, and the electromagnet interacting with the latching element in such a way that on transition of the electromagnet into its activated state, the latching element is transferred by the action of a magnetic force from its fixing position into its triggering position.
(ii) In an eighth embodiment, the module includes at least one activatable electric motor with a drive shaft, the electric motor interacting with the electrical contact switch in such a way that it drives the drive shaft to a predetermined rotary motion when the contact switch is switched into its triggering state, the latching device including a latching lever which is fixed to the drive shaft of the electric motor, with a fixing position and a triggering position, and the latching lever being transferred by the predetermined rotary motion of the drive shaft from its fixing position into its triggering position.

The seventh and eighth embodiments make reliable unlocking of the closure element from its closing position possible. It is reliable because the electromagnet or electric motor can be actively supplied with energy, and thus a sufficiently large, reliably acting force to actuate the latching element or latching lever is available.

In a ninth embodiment, the decompression device includes a lamellar grid arrangement as described above, and a locking device with a latching device and a triggering device as described above. In particular, the triggering device is in a form according to the alternative (1) described above, and includes at least one volume reservoir with a membrane or a flexible plastic film. The membrane or plastic film can have a pressure equalisation hole, which in normal operation of the aircraft makes pressure equalisation between an inner volume of the volume reservoir and a region outside the volume reservoir possible, so that the membrane or plastic film takes a relaxed shape, and which can be made sufficiently small so that in the case of decompression the air stored in the volume reservoir cannot escape fast enough through the pressure equalisation hole, and the membrane or flexible plastic film therefore bulges outward. In normal operation of the aircraft, the membrane or flexible plastic film has, for example, a substantially flat fixing shape, and in the case of decompression is deformed by an excess pressure, which occurs at least temporarily in the volume reservoir, into a bulging releasing shape. The latching device includes at least one latching pin with a first and a second end. The latching pin is connected at its first end to the membrane or flexible plastic film, and at its second end is bevelled and carried so that it is movable in its longitudinal direction between a closing position and a releasing position. In normal operation of the aircraft, the latching pin, because its membrane or flexible plastic film is in its fixing shape, is in its closing position, in which it fixes the closure element, so that the latter covers the second aperture. In the case of decompression, the latching pin is transferred into its releasing position by the membrane or flexible plastic film deforming into its releasing shape, and thus releases the locking of the closure element. If the closure element is in the form of a closure flap which is hinged at its first edge, the latching pin in normal operation of the aircraft acts on the second edge of the closure flap and fixes it in its closing position. In the case of decompression, the latching pin releases the second edge, so that the closure flap can pivot into its releasing position.

In a tenth embodiment, the decompression device includes a triggering device according to the alternative (2) described above, with at least one volume reservoir which is sealed by a movable plate. The movable plate can have a pressure equalisation bore, which has the same working function as the pressure equalisation aperture in the membrane or flexible plastic film in the ninth embodiment. The latching device includes a set of latching rods with at least one rod with a first end and a second end, at least one transmission lever with a first end and a second end, and at least one holding element. In normal operation of the aircraft, the movable plate is in a fixing position, and in the case of decompression is transferred by an excess pressure, which occurs at least temporarily in the volume reservoir, into a releasing position. The rod is connected at its first end to the movable plate, and at its second end, by means of a joint, to the first end of the transmission lever. The rod is carried so that it can be moved in its longitudinal direction between a closing position and a releasing position, and can thus rotate the transmission lever between a closing position and a releasing position. In normal operation of the aircraft, the rod is in its closing position because the plate is in its fixing position, and in the case of decompression it is transferred to its releasing position by the plate being transferred to its releasing position. The transmission lever is carried so that its second end engages with the holding element in its closing position, and thus fixes the closure plate in its closing position, and so that its second end no longer engages with the holding element in its releasing position, so that the closure flap can pivot into its releasing position. In a preferred embodiment, the set of latching rods is movable and connected to the closure flap on the side facing away from the cabin space, and the holding element is fixed on the rear of the cabin lining element in an edge region of the cabin lining element surrounding the second aperture.

In an eleventh embodiment, the decompression device includes a triggering device according to the alternative (1) described above, with a volume reservoir sealed by a membrane, with an actuating element in the form of a contact pin, at least one triggerable electrical contact switch as described above and one electrically controllable electromagnet as described above in variant (i). The membrane is in such a form that in normal operation of the aircraft it has a relaxed, e.g. substantially flat fixing shape, and in the case of decompression is deformed by an excess pressure, which occurs at least temporarily in the volume reservoir, into a bulging releasing shape. The latching element includes a latching pin with a first end and a bevelled second end. In normal operation of the aircraft, the latching pin acts with its second end on an edge, which is different from the first edge, of the closure flap, and fixes it in its closing position. In the case of decompression, the latching pin releases the closure flap, so that it can pivot into its releasing position. The contact pin is movable in its longitudinal direction between a closing position and a releasing position, and at its first end is connected to the membrane, and at its second end is designed to switch the electrical contact switch from its normal state, e.g. an electrically open state, into its triggering state, e.g. an electrically closed state. In normal operation of the aircraft, the contact pin, because the membrane is in its fixing shape, is in its closing position, and in the case of decompression it is transferred into its releasing position by the membrane deforming into its releasing shape, and switches the contact switch into its triggering state. The electromagnet is thus activated, and attracts the latching pin magnetically, so that the latter releases the closure flap.

In a twelfth embodiment, the compression device includes a triggering device according to the alternative (1) described above, with at least one volume reservoir sealed by a membrane, and with an actuating element in the form of a contact pin, at least one triggerable electrical contact switch as described above, and an electrically controllable electric motor as described in variant (ii) above. The membrane is in such a form that in normal operation of the aircraft it has, for example, a substantially flat fixing shape, and in the case of decompression, because of an excess pressure which occurs at least temporarily in the volume reservoir, it deforms into a for example bulging releasing shape. The contact pin is carried in such a way that it is movable in its longitudinal direction between a closing position and a releasing position. At its first end, it is connected to the membrane, and at its second end it is in a form to bring the electrical contact switch from its normal state, which for example is not electrically closed, into its triggering state, which for example is electrically closed. In normal operation of the aircraft, the contact pin, because of the membrane which is in its fixing shape, is in its closing position, and in the case of decompression is transferred into its releasing position by the membrane deforming into its releasing shape. It switches the electrical contact switch into its triggering state, so that the electric motor is actuated and rotates the rotary shaft and pivots the latching lever. In normal operation of the aircraft, the latching lever acts with its free end on a different edge of the closure flap from the first edge, and fixes it in its closing position. In the case of decompression, the pivoted free end of the latching lever releases the closure flap, so that the latter can pivot into its releasing position.

In a thirteenth embodiment, the decompression device includes a latching device with at least one rotary latch with a free end. The rotary latch is arranged on the rear of the cabin lining element, and carried so that it can rotate around an axis of rotation which is substantially perpendicular to the cabin lining element. The rotary latch is also in such a form that it is pivotable between a fixing position and a triggering position, triggered by the action of a set of actuation rods. The triggering device includes a pivotable triggering element as described above, which is in such a form that it interacts with the at least one rotary latch, via the set of actuation rods, in such a way that when it pivots from its fixing position into its triggering position, it transfers the rotary latch from its fixing position into its triggering position via the set of actuation rods.

In a fourteenth embodiment, the decompression device includes a closure element, which is in the form of a movably carried closure plate as described above, and which in its closing position is biased by a spring means in the direction of its releasing position. The device also includes a triggering device according to the variant (3) described above, with at least one cylinder with a movable piston, and with an actuating element, which includes a latching pin, which is in such a form that in its normal position it fixes the closure plate in the closing position against the biasing of the spring means, and in its triggering position it releases the closure plate, so that the latter, because of the biasing of the spring means, is transferred from its closing position into its releasing position.

In a fifteenth embodiment, the decompression device includes a lamellar grid arrangement, which covers the first aperture and the second aperture, and divides the first aperture into a first plurality of sub-apertures and the second aperture into a second plurality of sub-apertures. The first plurality and the second plurality can each be a plurality of sub-apertures which are arranged parallel to each other and extend in a longitudinal direction. The closure element is a closure flap which is detachably attached to the rear of the cabin lining element, as described above with reference to the third embodiment. In normal operation of the aircraft, the closure flap covers the second plurality of parallel sub-apertures, i.e. the second aperture. The locking device includes at least two attaching means, which for example each include a bent spring sheet, the closure plate being clamped in its closing position between the at least two attaching means and thus fixed. The at least two attaching means are fixed on the cabin lining element opposite each other on the rear of the cabin lining element, and in such a form that they exert a spring force on the closure plate in the lateral direction of the closure plate, so that in normal operation of the aircraft the closure plate is fixed in its closing position by a friction force caused by the spring force, and in the case of decompression can be pressed out of its closing position between the at least two attaching means of the cabin lining element by the growing pressure on the front of the cabin lining element, and by the pressure acting on the closure plate through the second plurality of sub-apertures, and can detach itself substantially completely from the cabin lining element.

BRIEF DESCRIPTION OF THE DRAWINGS

Preferred embodiments of the decompression device according to the invention are now explained in more detail on the basis of the attached schematic drawings.

FIG. 9 includes FIGS. 9a and 9b, of which:

FIG. 10 shows a ninth embodiment of a decompression device, and includes FIGS. 10a, 10b and 10c, of which:

FIG. 10a shows a cross-section view, through a cabin lining element, of the decompression device;

FIG. 10b shows a view of the decompression device seen from a rear of the cabin lining element; and FIG. 10c shows a detail view of FIG. 10b;

FIG. 11 shows the tenth embodiment described above of a decompression device, and includes FIGS. 11a, 11b and 11c, of which:

FIG. 11a shows a cross-section view, through a cabin lining element, of the decompression device;

FIG. 11b shows a view of the decompression device in the closing position corresponding to normal operation of the aircraft; and FIG. 11c shows a detail view of FIG. 11b, with the decompression device in its triggering state corresponding to the case of decompression;

FIG. 12 shows the eleventh embodiment described above of a decompression device, and includes FIGS. 12a, 12b and 12c, of which:

FIG. 12a shows a cross-section view, through a cabin lining element, of the decompression device;

FIG. 12b shows a view of the decompression device seen from a rear of the cabin lining element; and FIG. 12c shows a detail view of FIG. 12b;

FIG. 13 shows the twelfth embodiment described above of a decompression device, and includes FIGS. 13a, 13b and 13c, of which:

FIG. 13a shows a cross-section view, through a cabin lining element, of the decompression device in normal operation of the aircraft (locking);

FIG. 13b shows a view of the decompression device seen from a rear of the cabin lining element; and shows a detail view of FIG. 13a in the case of decompression, with the latching device in its triggering position;

FIG. 14 shows the thirteenth embodiment described above of a decompression device, and includes FIGS. 14a, 14b and 14c, of which:

FIG. 14a shows a cross-section view, through a cabin lining element, of the decompression device;

FIG. 14b shows a view of the decompression device seen from a rear of the cabin lining element in normal operation of the aircraft, i.e. with the latching device in its fixing position; and FIG. 14c shows a detail view of FIG. 14b in the case of decompression, i.e. with the latching device in its triggering position;

FIG. 15 shows the fourteenth embodiment described above of a decompression device, and includes FIGS. 15a, 15b and 15c, of which:

FIG. 15a shows a cross-section view, through a cabin lining element, of the decompression device;

FIG. 15b shows a view of the decompression device seen from a rear of the cabin lining element in normal operation of the aircraft, i.e. with the closure element in its closing position; and FIG. 15c shows a detail view of FIG. 15a in the case of decompression, i.e. with the latching device in its triggering position;

FIG. 16 shows a variant of the ninth embodiment of a decompression device shown in FIG. 10 and described above, and includes FIGS. 16a, 16b and 16c, of which:

FIG. 16a shows a cross-section view, through a cabin lining element, of the decompression device;

FIG. 16b shows a view of the decompression device seen from a rear of the cabin lining element in normal operation of the aircraft; and FIG. 16c shows a detail view of FIG. 16b in the case of decompression, i.e. with the latching device in its triggering position;

FIG. 17 shows the fifteenth embodiment of the decompression device described above, and includes FIGS. 17a, 17b and 17c, of which:

FIG. 17a shows a cross-section view, through a cabin lining element, of the decompression device in normal operation of the aircraft, i.e. with the closure element in its closing position;

FIG. 17b shows a view of the decompression device seen from a rear of the cabin lining element in normal operation of the aircraft; and FIG. 17c shows a cross-section through the cabin lining element of the decompression device in the case of decompression, i.e. with the closure element in its releasing position.

DETAILED DESCRIPTION

Figure 1:
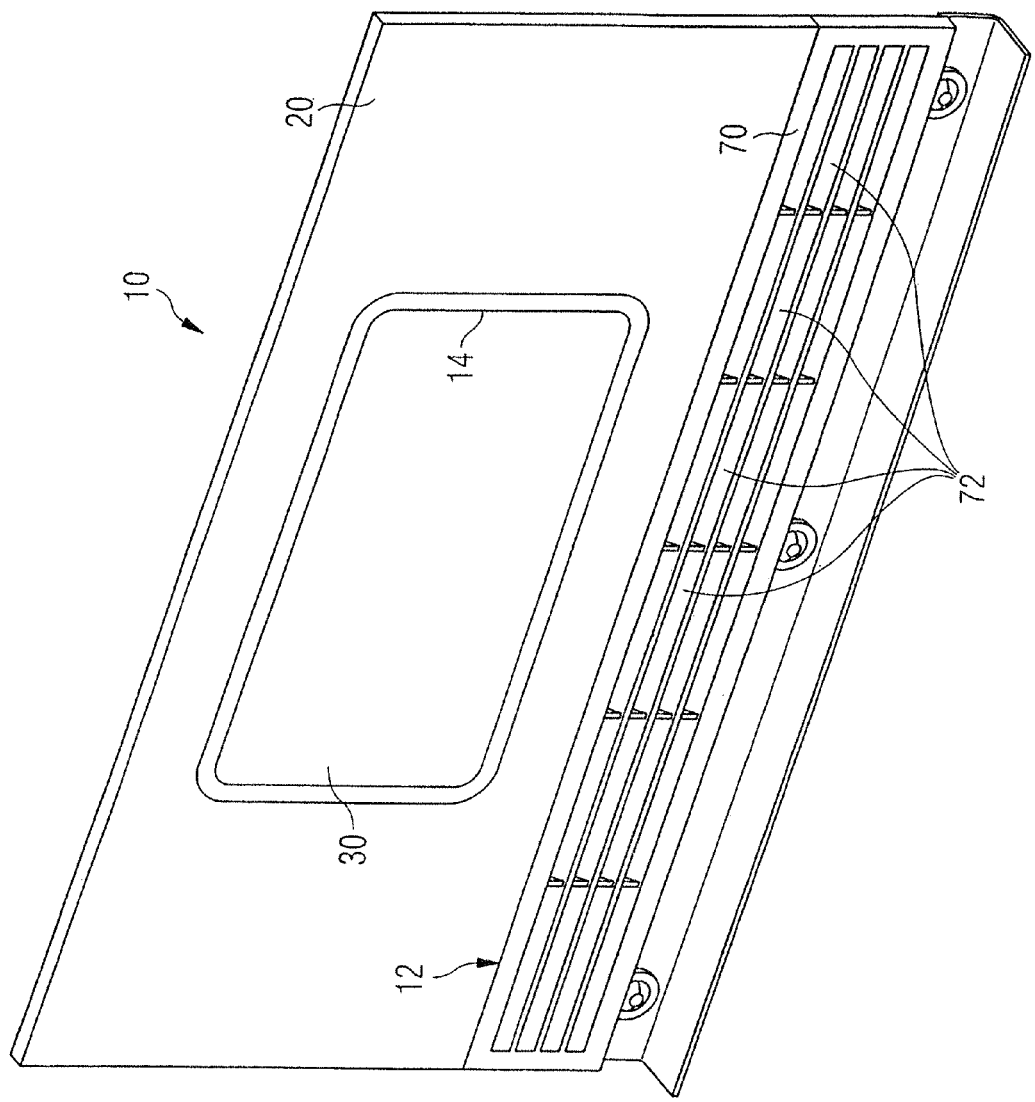
FIG. 1 is a cabin-side view of a preferred first embodiment of the decompression device according to the invention.
Figure 2:
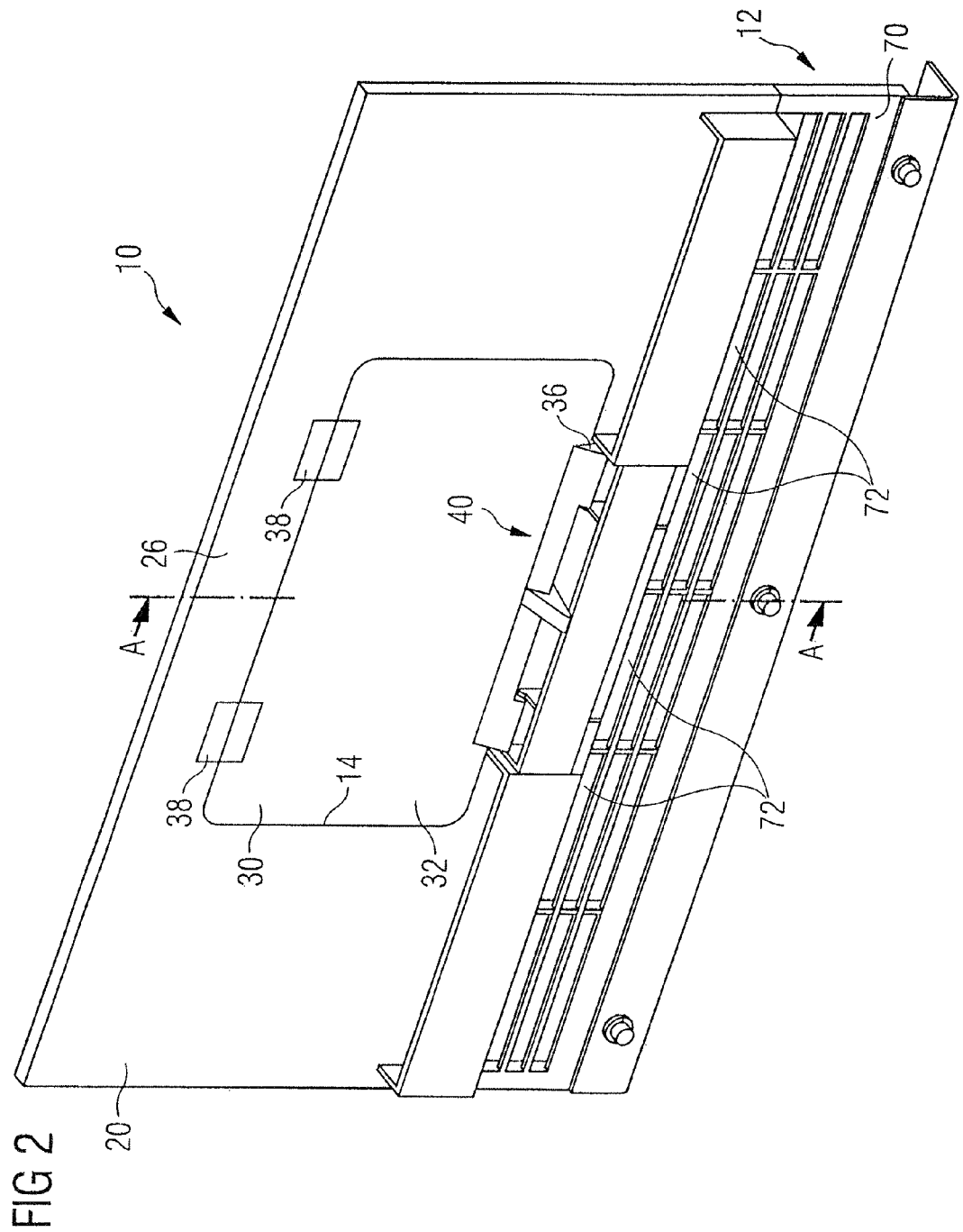
FIG. 2 is a view of the decompression device in FIG. 1 seen from a rear of the cabin lining element.
Figure 3:
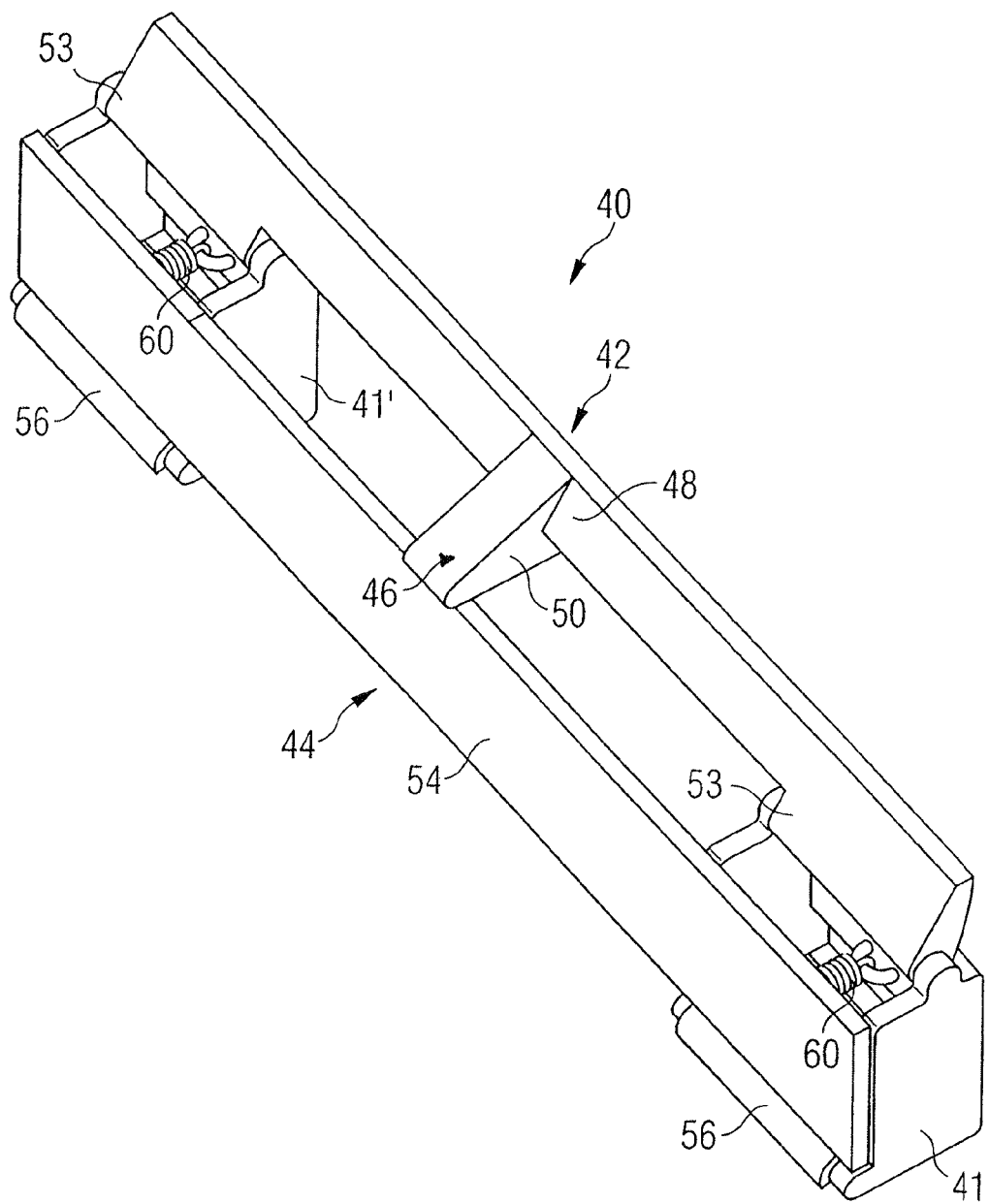
FIG. 3 is a view of a locking device, in the form of an integral module, of the decompression device shown in FIGS. 1 and 2, in its closing position.

As shown in FIGS. 1 and 2, a decompression device 10 in a preferred first embodiment includes a cabin lining element 20, which in a lower region, the so-called foot region, has a first aperture 12 and a second aperture 14. The first aperture 12 is covered by a lamellar grid arrangement 70, which is fixed from the cabin side on the cabin lining element 20. The aperture holes of the first aperture are dimensioned so that in normal operation of the aircraft, i.e. a normal operating state when the aircraft is flying at a cruising altitude, an exhaust air flow portion, which is associated with the cabin lining element, of the total exhaust air flow from the cabin of the aircraft flows through the first aperture 12.

It should be noted that FIGS. 1 and 2 and FIGS. 7, 8 and 10 to 17 show a sub-region of the cabin lining element 20, which with respect to its width shown in the above-mentioned figures is adapted to a width dimension of the first aperture 12.

In normal operation of the aircraft, the second aperture 14 is closed by an unlockable, detachable closure element 30. The closure element 30 is designed for unlockably closing of the second aperture 14, and in normal operation of the aircraft is arranged detachably in a closing position on or in the second aperture 14, so that the second aperture is closed. After unlocking, which is described in more detail below with reference to FIGS. 5 and 6, the closure element 30 can take a releasing position which is different from its closing position shown in FIGS. 1 and 2, so that the second aperture 14 is opened, as can be seen in FIG. 7. The aperture surface of the open second aperture 14 is dimensioned so that in a case of decompression, a decompression air flow portion, which is associated with the cabin lining element 20, of a total decompression air flow from the cabin of the aircraft flows through the first aperture 12 and the open second aperture 14.

In the preferred embodiment shown in FIGS. 1 to 9, the closure element 30 is in the form of a pivotable closure flap 32. The closure flap 32 has a first edge 34, along which it is hinged at an edge region 26 of the cabin lining element 20 adjacent to the second aperture 14 by means of two hinge devices 38 (see FIG. 2) so that it can pivot. The closure flap 32 also has a second edge 36 opposite the first edge 34. At least on a sub-region of the second edge 36, in normal operation of the aircraft an unlockable locking device 40 acts, and in normal operation of the aircraft fixes the closure flap 32 in its closing position shown in FIGS. 1 and 2.

In general, the locking device 40 is designed to fix the closure element 30, in particular the closure flap 32, in normal operation of the aircraft, in its closing position on or in the second aperture 14, and in the case of decompression to release the fixing of the closure element 30, in particular the closure flap 32, so that it can take its releasing position (shown in FIG. 7). The locking device 40 is mounted on the rear of the cabin lining element 20 in an edge region of the cabin lining element 20 along the second edge 36 of the closure flap 32, adjacent to the second aperture 14, as shown in FIG. 2.

In all embodiments, the locking device includes a latching device, which in normal operation of the aircraft takes a fixing position, so that the closure element is fixed in its closing position, and which in the case of decompression takes a triggering position, so that the fixing of the closure element is detached, and a triggering device, which in normal operation of the aircraft takes a fixing state, and which is in such a form that it interacts with the latching device so that the latching device, in normal operation of the aircraft, takes its fixing state, in which the latching device takes its fixing position, and said latching device in the case of decompression takes a triggering state, so that the latching device is transferred into its triggering position.

Figure 4:
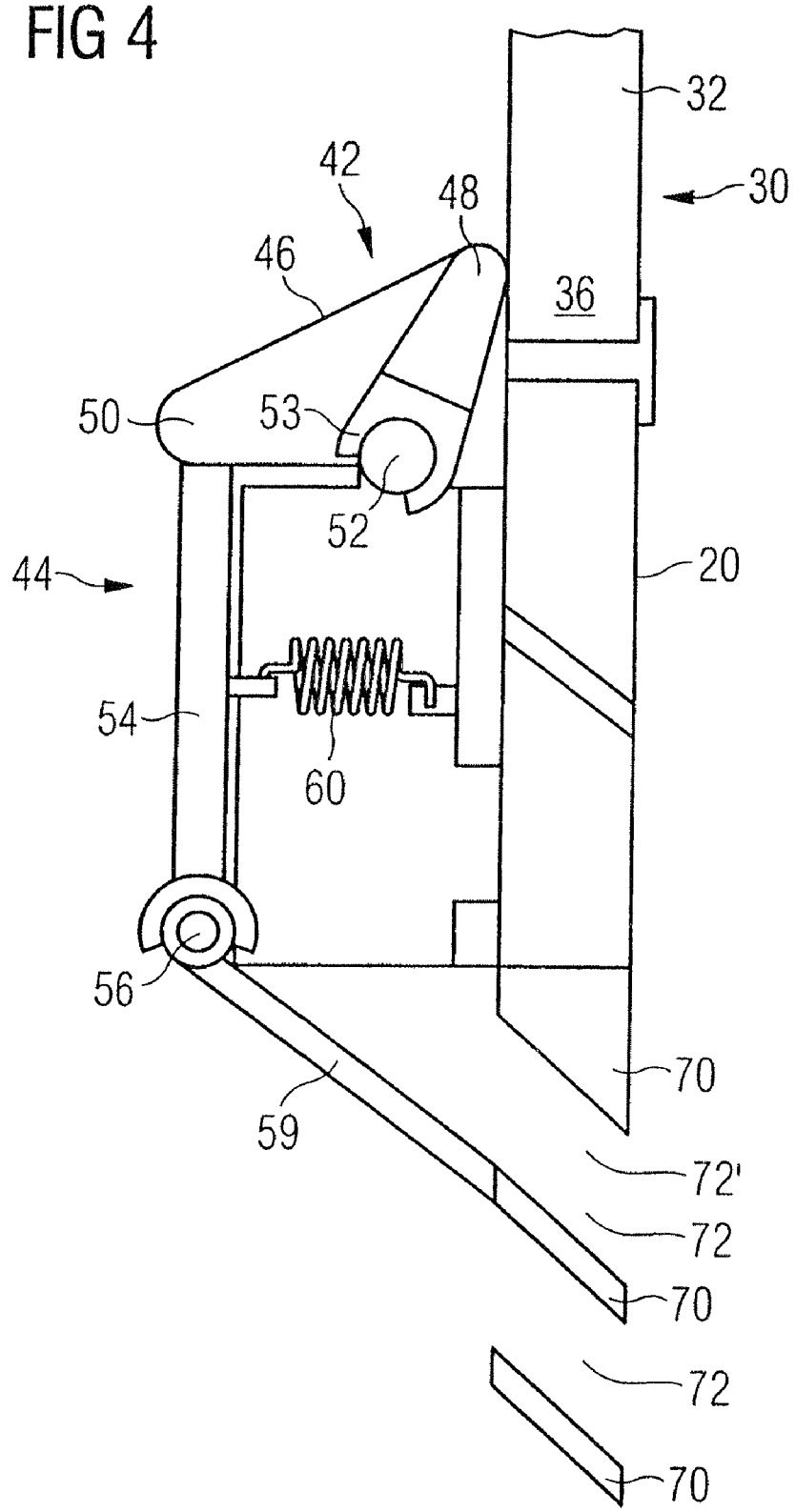
FIG. 4 is a cross-section view, taken along the line A-A in FIG. 2, of the locking device of the decompression device shown in FIGS. 1 to 3, in its fixing position.
Figure 5:
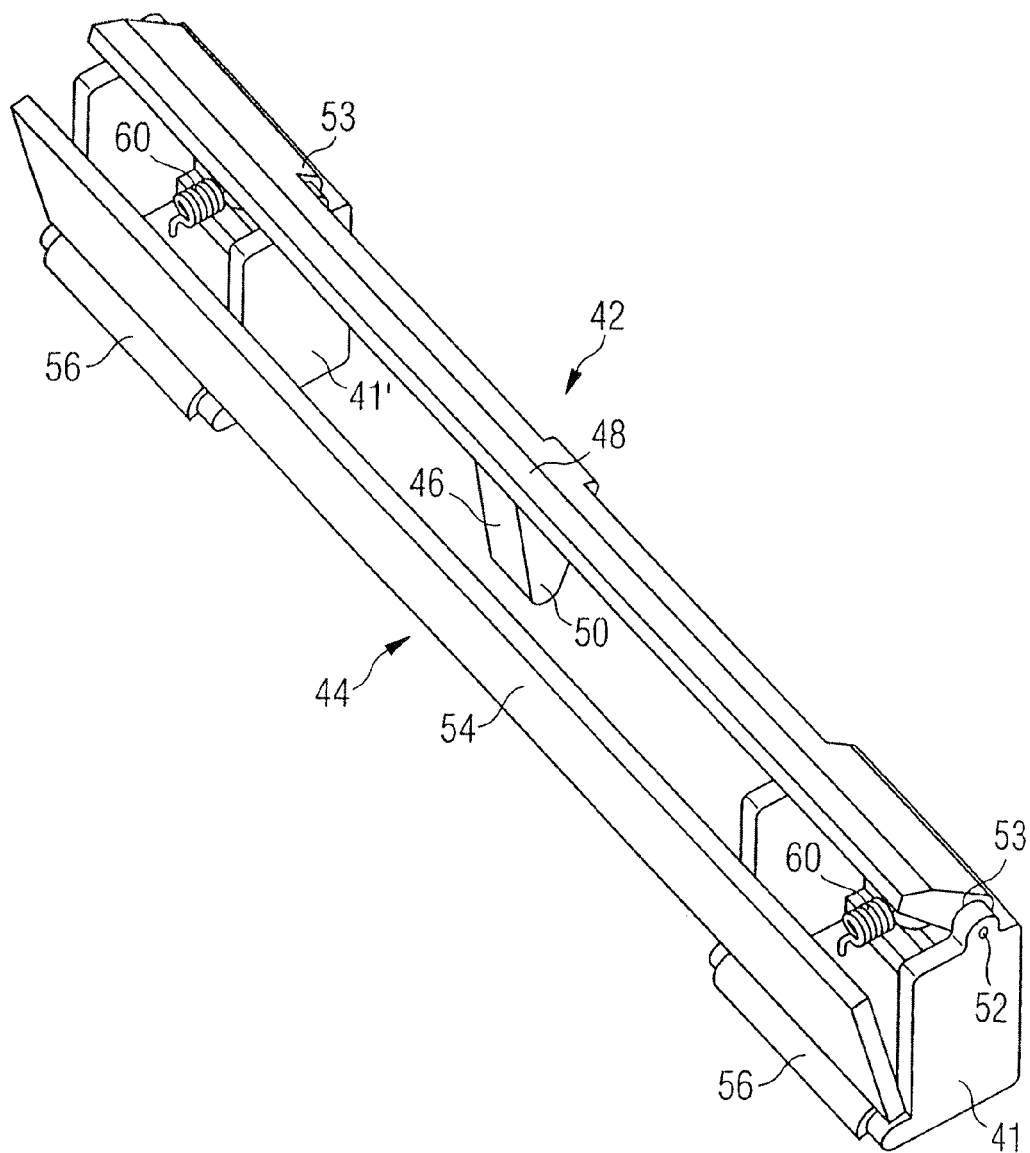
FIG. 5 is a view of the locking device in the form of an integral module and shown in FIG. 3, in its triggering position.
Figure 6:
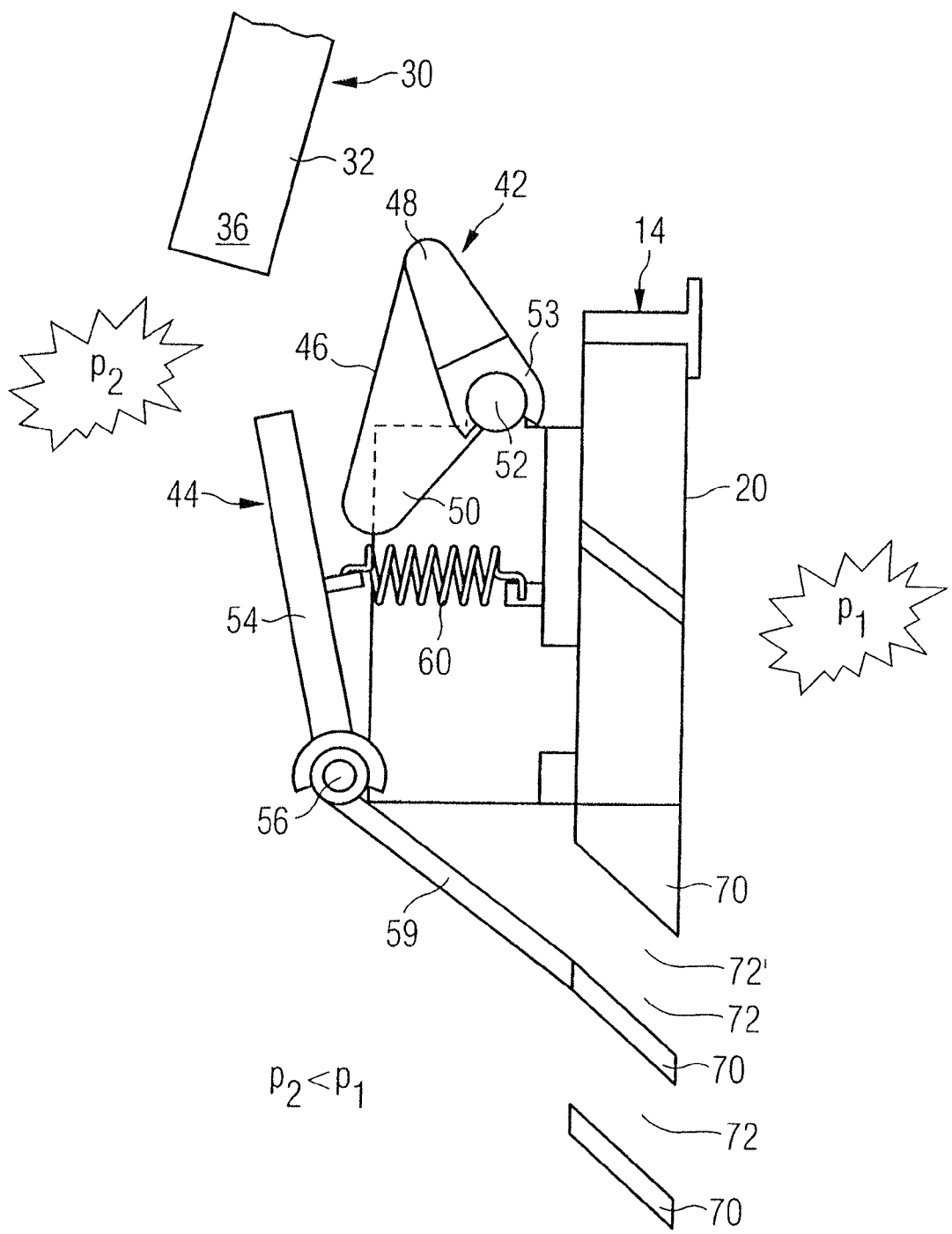
FIG. 6 is a cross-section view, taken along the line A-A in FIG. 2, of the locking device in the form of an integral module and shown in FIG. 4, in its triggering position.
Figure 7:
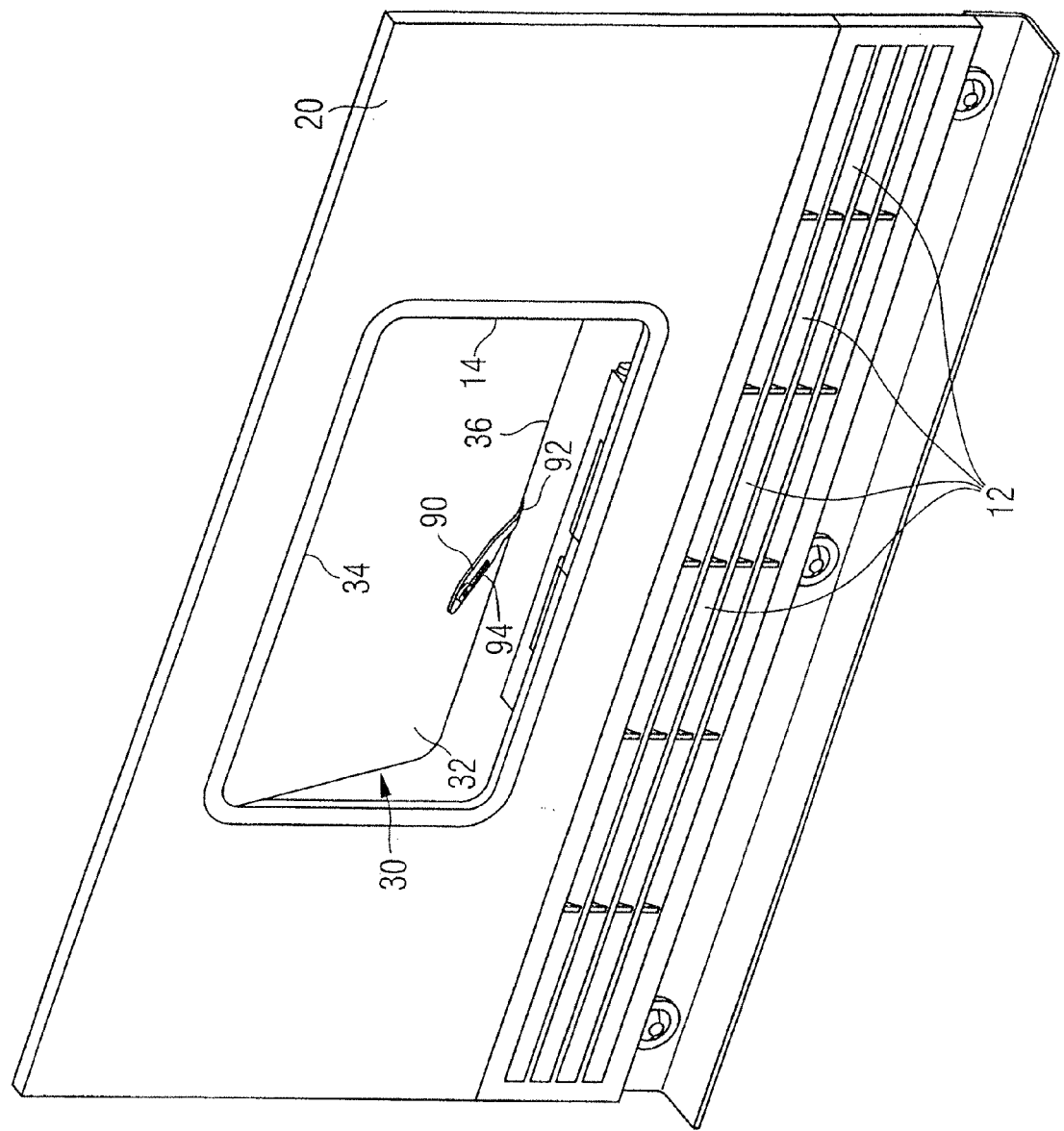
FIG. 7 is a cabin-side view of the decompression device shown in FIGS. 1 to 6 with a closure flap in its releasing position, e.g. after a case of decompression, a special tool being placed on the closure flap, to return it to its closing position.

In the preferred first embodiment shown in FIGS. 1 to 9, the locking device 40 includes, as a triggering device 44, a pivotable triggering element 54, which can be pivoted between a fixing position corresponding to its fixing state (see FIGS. 3 and 4) and a triggering position corresponding to its triggering state (see FIGS. 5 and 6). The triggering element is a plate 54, which is hinged on a side of the locking device 40 facing away from the cabin lining element 20, and extends substantially over the width and height of the locking device 40, and which at its lower end (in FIGS. 3 to 6) is hinged on the locking device 40 by means of two rotary hinges 56 so that it can rotate around the rotary hinges 56.

The latching device 42 includes an angle section 46, with a substantially L-shaped profile in cross section (see FIGS. 4 and 6). The angle section 46 includes a first leg region 48, which extends substantially over the width of the locking device 40, a second leg region 50, which extends from the first leg region 48 on the side facing away from the cabin lining element 20, and tapers, and in a median region of the first leg region 48 is connected to the leg region 48, and two rotary hinges 53, which define a common axis of rotation 52. The common axis of rotation 52 runs through a region where the first and second leg regions 48, 50 meet, or in an adjacent region to this region. The angle section 46 can be pivoted around its axis of rotation 52 between a locking position (see FIGS. 3 and 4) and a releasing position (see FIGS. 5 and 6). As shown best in FIG. 4, in normal operation of the aircraft, the first leg region 48 of the angle section 56 acts at least on a sub-region of an edge region of the closure flap 32 extending along the second edge 36, and thus fixes the closure flap 32 in its closing position.

The triggering device 44, i.e. the pivotable triggering element 54, works with the second leg region 50 of the latching device 42 as follows. In normal operation of the aircraft, shown in FIGS. 3 and 4, the triggering element 54 in its fixing position supports the second leg region 50, so that the angle section 46 is held in its locking position, and in this case acts or presses on the second edge 36 of the closure flap 32 with its first leg region 48, and thus fixes the closure flap 32 in its closing position. In the case of decompression, which is shown best in FIGS. 5 and 6, the pivotable triggering element 54 pivots into its triggering position, and thus, on its upper edge, releases the second leg region 50 of the angle section 46, so that the angle section 46 pivots around its axis of rotation 52 into its releasing position (also shown in FIGS. 5 and 6), in which case the first leg region 48 of the angle section 56 detaches itself from the second edge 36 of the closure flap 32, and thus detaches the fixing of the closure flap 32, so that the closure flap 32 can pivot into its releasing position.

The pivotable triggering element 54 is biased in its fixing position by means of two spring elements 60. The spring elements 60, like the rotary hinges 53 of the angle section 46 and the rotary hinges 56 of the triggering element 54, are housed in two sub-housings 41, 41' which are formed at the outer ends of the locking device 40.

The locking device 40 also includes an air flow conveying element 59 (e.g. see FIGS. 4 and 6), which is arranged and designed so that it conveys an air flow which flows through a top sub-aperture 72' of the sub-apertures 72 formed by the lamellar grid arrangement 70 in the first aperture 12 onto the triggering element 54, so that this air flow flowing through the sub-aperture 72' flows onto the triggering element. If the air flow onto the triggering element 54 exceeds a predetermined threshold flow value, and thus exceeds a pressure which is exerted on the triggering element 54, or the force which corresponds to this pressure and is applied to the triggering element 54 exceeds the biasing force of the spring elements 60, the triggering element 54 pivots into its triggering position.

After the fixing of the closure flap 32 is detached, it must be transferred back from its releasing position into its closing position, in which it closes the second aperture. The latching device, i.e. the angle section 46, must also be transferred back from its triggering position into its closing position, and the triggering device 44, i.e. the triggering element (the plate) 54, must be transferred back from its triggering state into its fixing state. For this purpose, a special tool 90 is provided, as shown in FIGS. 7 to 9.

The special tool 90 has a first and a second end. The first end is in the form of a bent region 92. At the second end of the special tool 90, opposite the first end, a pin 94 is rotatably fixed. The pin 94 can be pivoted from an idle position, in which it points from its pivot bearing at the second end of the special tool 90 in the direction of the first end, manually into a working position, in which the pin 94 extends beyond the second end of the special tool 90.

Figure 8:
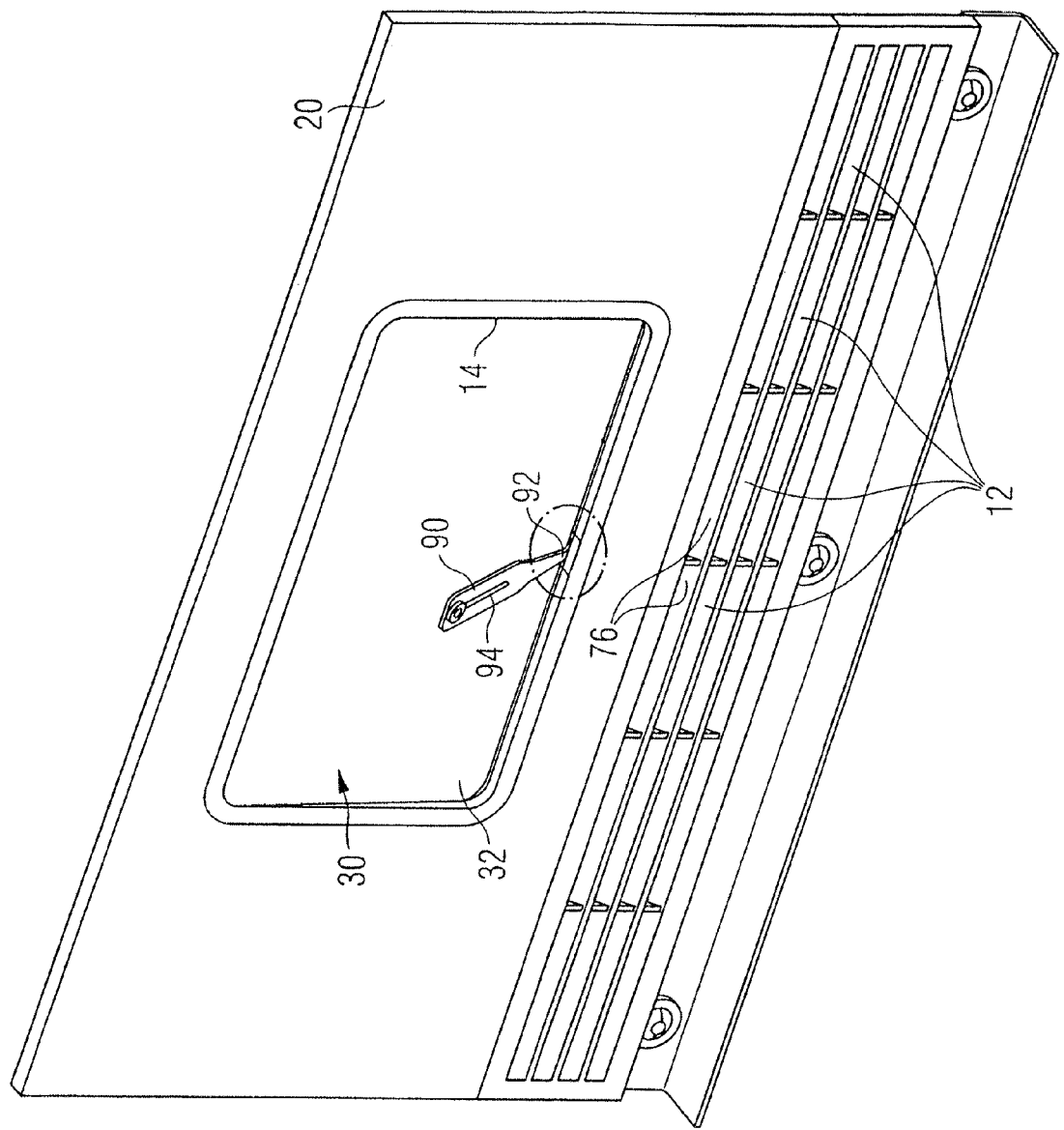
FIG. 8 is a cabin-side view of the decompression device, where the closure flap has been returned to its closing position by means of the special tool shown in FIG. 7.
Figure 9A:
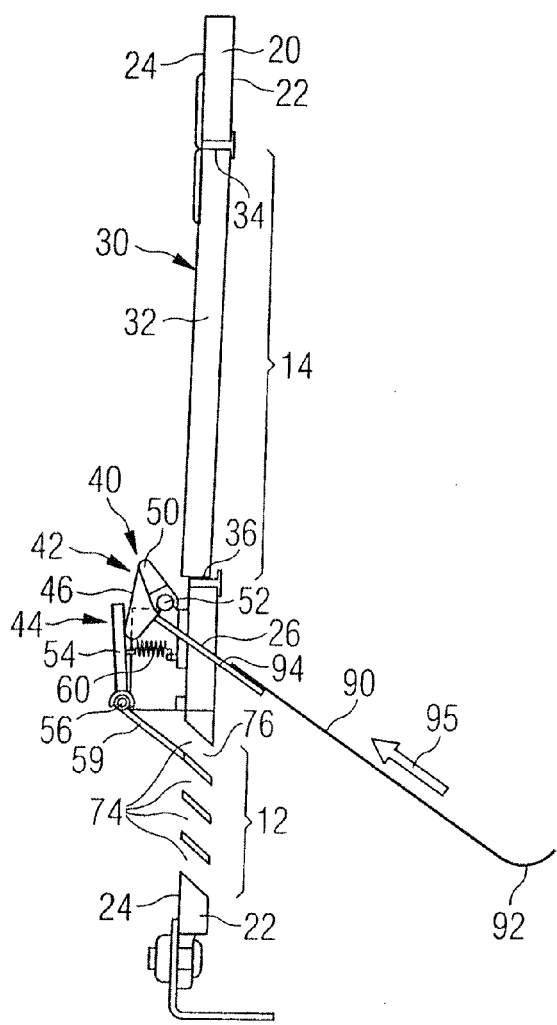
FIG. 9a shows a cross-section view, taken along the line A-A in FIG. 2, of the decompression device shown in FIGS. 1 to 6, the special tool, after the closure flap is returned to its closing position, being placed for a second time on the latching device, which is still in its triggering position, to return the latching device to its fixing position.
Figure 9B:
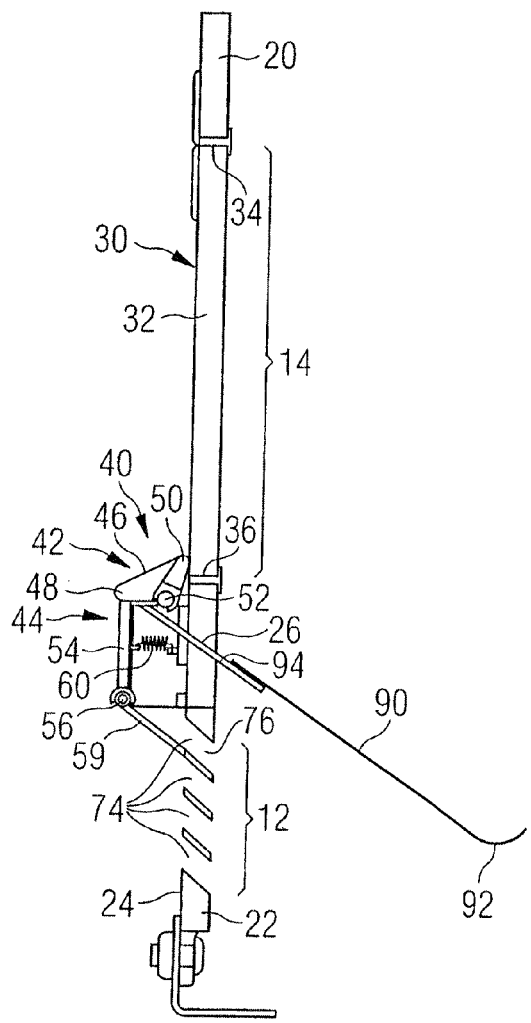
FIG. 9b shows a cross-section view, taken along the line A-A in FIG. 2, of the decompression device, after the latching device has been returned to its fixing position by means of the special tool.

To transfer the closure flap 32 back from its releasing position into its closing position, the special tool 90, with its bent end region 92, is hooked manually on the second edge 36 of the closure flap 32, as shown in FIG. 7, and then pulled in the direction of the second aperture 14, until the closure flap 32 has taken its closing position again, as shown in FIG. 8. To reset the latching device into its fixing position and the triggering device into its fixing state, the pin 94 of the special tool 90 is pivoted into its working position, and inserted through a bore 26 running diagonally through the cabin lining element 20 (as shown in FIG. 9A), and there pushed through in the direction of the arrow 96 shown in FIG. 9A, until a distal end of the pin 94 touches the second leg region 50 of the angle section 46, as shown in FIG. 9A. A thrust onto the special tool is then increased slightly, and the special tool 90, with the pin 94, is pushed further in the direction of the arrow 96, until the angle section 46 has been transferred back into its locking position, as shown in FIG. 9B. When the angle section 46 has resumed its locking position and thus its fixing state, corresponding to normal operation of the aircraft, the biasing force of the spring elements 60 causes the pivotable triggering element 54 to pivot back from its triggering position (see FIG. 9A) into its fixing position (see FIG. 9B), corresponding to the fixing state.

In the above-mentioned ninth embodiment, shown in FIG. 10, of a decompression device according to the invention, a triggering device 144 includes two volume reservoirs 145, each of which is sealed with a membrane 146, and corresponding actuation pins 148, each of which is connected to a membrane 146. The volume reservoirs 145 are arranged on the rear of the cabin lining element 20 in an edge region of the cabin lining element 20, adjacent to the second edge 36 of the closure flap 32. A latching device 142 of the decompression device is formed by two latching pins 143, each of which has a first and a second end, and two corresponding latching pin guiding elements 141, which have a bore to receive the second end of the latching pin 143, and interact with an appropriate latching pin 143, and are fixed on the second edge of the closure flap 32. The first end of each latching pin 143 is connected to an appropriate membrane 146 of the volume reservoir 145. The second end of each latching pin 143 extends in normal operation of the aircraft through the bore which is provided in the latching pin guiding element 141, and is movably guided in it in its longitudinal direction (see FIGS. 10a and 10b).

Each membrane 146 has a pressure equalisation hole, through which, in normal operation of the aircraft, the air pressure within the volume reservoir 145 can be equalised with the air pressure in an environment of the volume reservoir 145, so that the membrane 146 has a substantially flat fixing shape, corresponding to normal operation of the aircraft. When a membrane 146 has its substantially flat fixing shape, a latching pin 143 extends though the bore in an appropriate latching pin guiding device 141, and thus fixes the closure flap 32 in its closing position (see FIGS. 10a and 10b). In the case of decompression, if the air pressure in the environment of a volume reservoir 145 falls rapidly, the air pressure within a volume reservoir 145 cannot be equalised fast enough through the pressure equalisation hole with the air pressure in the environment of the volume reservoir 145, so that within the volume reservoir 145, excess pressure occurs at least temporarily. Because of this excess pressure, each membrane 146 is deformed into a bulging so-called releasing shape; a latching pin 143 with its second end is pulled out of the bore in the latching pin guiding element 141 (see FIG. 10c), so that the fixing of the closure flap 32 in its closing position is detached, so that the closure flap 32 becomes freely pivotable and can pivot into its releasing position, in which it releases the second aperture 14.

In the above-mentioned tenth embodiment, shown in FIG. 11, of a decompression device according to the invention, a triggering device 244 includes a volume reservoir 245 which is fixed on the rear of the closure flap 32, with a plate 246 which seals the volume reservoir 245 and is arranged movably in it, and an actuating element in the form of a rod 247 with a first end and a second end. A latching device 242 of the decompression device includes a set of latching rods, with the rod 247, two transmission levers each with a first end and a second end, and a lever pivot bearing 249 which is arranged between the first and second ends, and two holding elements 243, which each interact with the second end of the transmission lever 248 and are fixed at opposite edge regions of the cabin lining element 20 near the second aperture 14. The rod 247 is connected at its first end to the movable plate 246, and at its second end to a joint which connects the first ends of the transmission levers 248. The transmission levers 248 are carried rotatably on the lever pivot bearings 249, which are arranged on the rear of the closure flap 32. In normal operation of the aircraft, the second end of each transmission lever 248 engages with a corresponding holding element 243, as shown in FIGS. 11a and 11b, so that the closure flap 32 is fixed in its closing position.

The plate 246 which seals the volume reservoir 245 and is carried movably in it has a pressure equalisation bore, which has a comparable function to the pressure equalisation aperture in the membrane 146 in the ninth embodiment. In the case of decompression, when the pressure in an environment of the volume reservoir 245 falls rapidly, the plate 246, because of an excess pressure which occurs at least temporarily within the volume reservoir 245, moves from the inside of the volume reservoir 245 to the outside. Because of the movement of the plate 246, the rod 245 is also moved in its longitudinal direction, the transmission lever 248 being rotated around the lever pivot bearing 249 because of the coupling via the joint. Because of this rotation, the second end of a transmission lever 248 moves out of the holding element 243, so that the second end of the transmission lever 248 no longer engages with the holding element 243. In this way the fixing of the closure flap 32 in its closing position is released, as shown in FIG. 11c, and the closure flap 32 can pivot into its releasing position and release the second aperture 14.

In the above-mentioned eleventh embodiment, shown in FIG. 12, of a decompression device according to the invention, the triggering device 344 includes a volume reservoir 345 which is sealed by a membrane 347, with an actuating element in the form of a contact pin 348, a triggerable electrical contact switch 349, and two electrically actuatable electromagnets 349, which are all arranged on the rear of the cabin lining element 20, as shown in FIGS. 12a and 12b. The latching device 342 includes two latching pins 343, which interact with the appropriate electromagnets 349 and each have a first and a second end, and two latching pin guiding elements 341 which work with the latching pins 343, with a bore which is designed to receive the second end of an appropriate locking pin 343. The latching pin guiding elements 341 are each fixed on the rear on the second edge of the closure plate 32. A latching pin 343 is arranged so that it can move in its longitudinal direction between a locking position and a releasing position. In normal operation of the aircraft, a locking pin 343 takes its locking position, in which its second end is received in the bore of the latching pin guiding element 341, as shown in FIGS. 12a and 12b.

The membrane 347 which seals the volume reservoir 345 has a pressure equalisation bore, which has a comparable function to the pressure equalisation aperture in the membrane 146 in the ninth embodiment. In normal operation of the aircraft, the air pressure within the volume reservoir 345, because of the effect of the air equalisation aperture, is equal to the air pressure in an environment of the volume reservoir 345, so that the membrane 347 takes a relaxed, so-called fixing state, as shown in FIGS. 12a and 12b. In the case of decompression, if the air pressure in the environment of the volume reservoir 345 falls rapidly, the membrane 347 bulges outward because of the excess pressure which occurs at least temporarily within the volume reservoir 345, and thus moves the contact pin 348 in the direction to and against the contact switch 349, which thus switches into an activated, e.g. electrically closed, state, and thus enables an electrical current through the electromagnet 350. Because of the current, the electromagnets 350 are activated, and attract the latching pins 343 magnetically from their fixing position, so that they are transferred into their triggering position. In this case the first end of the latching pin 343 is pulled at least partly into an axial aperture of a magnetic coil of the electromagnet 350. Also, the second end of the latching pin 343 is pulled out of the bore of the latching pin guiding device 341, see FIG. 12c, and thus the fixing of the closure flap 32 in its closing position is detached. Thus the closure flap 32 can pivot into its releasing position and thus release the second aperture 14.

In the above-mentioned twelfth embodiment, shown in FIG. 13, of a decompression device according to the invention, a triggering device 444 includes a volume reservoir 445 which is sealed by a membrane 447, with an actuating element in the form of a contact pin 448, a triggerable electrical contact switch 449, and an actuatable electric motor 445 with a drive shaft 446 which is driven by the electric motor 45. The latching device 442 includes two latching levers 443 which are fixed on the drive shaft 446, and which can be transferred by a predetermined rotary motion of the drive shaft 446 from a fixing position into a triggering position. The triggering device 444 and the latching device 442 are arranged on the rear of the cabin lining element 20, the drive shaft 446 running substantially parallel to the second edge 36 of the closure flap 32 in an edge region of the cabin lining element 20 adjacent to the second edge 36.

The membrane 447 has a pressure equalisation aperture, which has a comparable function to the membrane 146 in the ninth embodiment. In normal operation of the aircraft, the membrane 447 takes a relaxed fixing shape. The rotary shaft 446, with the latching levers 443 attached to it, takes a locking position, in which the free ends of the latching levers 443 lie against the closure plate 32 in the region of the second edge 336 and fix it in its closing position. In the case of decompression, if the air pressure in the environment of the volume reservoir 445 falls, the membrane 447 bulges outward because of the excess pressure which occurs at least temporarily within the volume reservoir 445, and thus moves the contact pin 448 in the direction of the contact switch 449, so that the contact pin 448 touches the contact switch 449 and switches the contact switch 449 into its activated, e.g. electrically closed, state. The electric motor 445 is thus activated, and drives the drive shaft 446 to a predetermined rotary motion, in particular with a predetermined angle of rotation. Because of the rotary motion of the drive shaft 446, the latching levers 443 detach themselves from the closure plate 32, and thus detach the fixing of the closure plate 32, so that the latter can pivot from its closing position into its releasing position and thus release the second aperture 14.

In the above-mentioned thirteenth embodiment, shown in FIG. 14, of a decompression device according to the invention, the latching device 542 includes two rotary latches 543, each with one free end 544. The rotary latches 543 are arranged on the rear of the cabin lining element 20, and carried so that they can rotate around an axis of rotation which is substantially perpendicular to the cabin lining element 20, in such a way that the rotary latch 543 can be pivoted between a fixing position (which is shown in FIG. 14b and in which the closure flap 32 is fixed in its closing position) and a triggering position (which is shown in FIG. 14c and in which the fixing of the closure flap 32 in its closing position is detached). The triggering device 544 includes a pivotable triggering element 554, which similarly to the pivotable triggering element 554 (in the preferred embodiment of the invention) which is shown, for example, in FIGS. 3 to 6, is flowed on by a flow through a top sub-aperture 72' of the plurality of sub-apertures 72 formed by a lamellar grid arrangement 70.

Each rotary latch 543 is in such a form that it can be pivoted between a fixing position and a triggering position, and is biased by an elastic element (not shown) in its fixing position in the direction of its triggering position. The pivotable triggering element 554 is connected via a set of actuation rods 547 to the rotary latches 543. Now, in the case of decompression, if the pivotable triggering element 554 is pivoted from its fixing position into its triggering position by the air flow which flows onto it, is increasing and exceeds an air flow threshold value strength, the set of actuation rods 547 is moved, and causes the triggering of the rotary latches 543 on their fixing position into their triggering position by the biasing effect of the elastic element, so that the closure flap 32 becomes pivotable and can take its releasing position, in which the second aperture 14 is released.

In the above-mentioned fourteenth embodiment, shown in FIG. 15, of a decompression device according to the invention, the closure element is in the form of a closure plate 632 which is arranged on the rear of the cabin lining element 20 and carried there so that it can move between two guide rails 647 parallel to the cabin lining element 20. The closure plate 632 is biased in its closing position shown in FIG. 15b by two spring means 649, which are each provided in a sub-region of the guide rails 647, in its fixing position in the direction of its releasing position. The triggering device 644 includes two cylinders 645, each with a movable piston 646 arranged in it, and an actuating element in the form of a latching pin 648. Each latching pin 646 has a first end, which is connected to the movable piston 646, and a second end, which in normal operation of the aircraft, in an edge region of the closure plate 632, interacts with the latter, e.g. by the second end engaging with a receiving aperture which is provided in the closure plate 632, or by blocking an edge of the closure plate 632. Each movable piston 646 has a pressure equalisation aperture, through which in normal operation of the aircraft the pressure within the cylinder 645 can be made equal to the air pressure in an environment of the cylinder 645. In the case of decompression, if the air pressure in the environment of the cylinders 645 falls rapidly, the movable piston 646, because of an excess pressure which occurs at least temporarily within the volume reservoir 245, moves from the inside of the cylinder 645 to the outside, and in this movement takes the latching pin 648 with it. Thus the second end of the latching pin 648 can no longer interact with the edge of the closure plate 632, and detaches the fixing of the closure plate 632 in its closing position. After its fixing is detached, the closure plate 632, because of the effect of the biasing spring means 649, moves into its releasing position, and releases the second aperture 14.

In the above-mentioned fifteenth embodiment, shown in FIG. 16, of a decompression device according to the invention, the triggering device 744 includes a volume reservoir 745, which is sealed with a flexible plastic film 747 with a pressure equalisation hole, and an actuating element in the form of a latching pin 743. The latching device 742 includes the latching pin 743 and pin guiding elements 741 which are fixed on the second edge of the closure flap. This embodiment differs from the ninth embodiment shown in FIG. 10 in that the volume reservoir 745 is sealed by means of a flexible plastic film 747 and not, like the volume reservoir 145 in FIG. 10, by means of a membrane 146.

In the embodiments shown in FIGS. 10, 11, 14 and 16 of the decompression device, the closure plate 32 is connected by means of two hinges on its first edge to the cabin lining element 20 so that it can pivot in the second aperture 14. The hinge can be in the form of a flap hinge 38 or a film hinge. For example, in the embodiments shown in FIGS. 12 and 13, the hinge is, for example, in the form of a fabric tape 238 (see FIGS. 12a and 12b) or a flexible plastic strip 438 (see FIGS. 13a and 13b).

In the above-mentioned fifteenth embodiment, shown in FIG. 17, of a decompression device according to the invention, a lamellar grid arrangement 870 covers the first aperture 12 and the second aperture 14, and divides the first aperture 12 into a first plurality of parallel sub-apertures 872 and the second aperture 14 into a second plurality of parallel sub-apertures 873. The closure element is in the form of a closure plate 832 which is detachably attached to the rear of the cabin lining element 20. The closure plate 832, in its closing position corresponding to normal operation of the aircraft, covers the second plurality of parallel sub-apertures 873 of the second aperture 14. A locking device 840 includes two pairs of attaching means 844 with bent spring sheets 843, the attaching means 844 of each pair being fixed on the cabin lining element 20 on two opposite edge regions of the second aperture 14 on the rear of the cabin lining element 20. The distance of the attaching means and a biasing force of each spring sheet 843 are in such a form that the closure plate 632 is fixed in its closing position between the spring sheets 843 by a clamping hold, the spring sheets 843 exerting a spring force in the lateral direction of the closure plate 632. In normal operation of the aircraft, the closure plate 632 is fixed in its closing position by a friction force caused by the spring force. In the case of decompression, the closure plate 632 can be pressed out of its closing position between the spring sheets 843 of the cabin lining element 20 by the growing pressure on the front of the cabin lining element 20, and can detach itself substantially completely from the cabin lining element 20, as shown in FIG. 17c.

At least one attaching means 844 and preferably two attaching means 844 which are arranged on the same edge region of the second aperture 14 each include a check strap 849 with a first end, which is fixed to the closure plate 632, and a second end, which is fixed to the rear of the cabin lining element 20. The purpose of the check strap 849 is to prevent the closure plate 632 removing itself far from the cabin lining element 20, in particular the second aperture 14, possibly so that it is difficult to find again, and to make it possible to find the closure plate 632 again easily near the second aperture after a case of decompression.

The invention claimed is:

1. A decompression device for an aircraft, comprising:
a cabin lining element, which has a first aperture and a second aperture,
the first aperture being dimensioned so that in normal operation of the aircraft an exhaust air flow portion, which is associated with the cabin lining element, of a total exhaust air flow from a cabin of the aircraft flows through the first aperture,
the second aperture being dimensioned so that, in a case of decompression, a decompression air flow portion which is associated with the cabin lining element of a total decompression air flow from the cabin of the aircraft can flow through the first and second apertures,
an unlockable closure element, which is fixable in a closing position on or in the second aperture in such a way that the second aperture is closed, and which after unlocking can take a releasing position which is different from the closing position, so that the second aperture is opened, wherein the closure element includes a pivotable closure flap, and
a locking device, which is designed to fix the closure element in normal operation of the aircraft in the closing position on or in the second aperture, and in the case of decompression to release the fixing of the closure element, so that the closure element can take the releasing position, wherein the locking device includes:
a latching device, which in normal operation of the aircraft takes a fixing position, by which the closure element is fixed in the closing position, and which in the case of decompression takes a triggering position, by which the fixing of the closure element is released, and
a triggering device, which in normal operation of the aircraft takes a fixing state, and which is in such a form that it interacts with the latching device in such a way that the latching device, in normal operation of the aircraft, takes the fixing state, in which the latching device takes the fixing position, and which in the case of decompression takes a triggering state, whereby the latching device is transferred to the triggering position
wherein the latching device includes an angle section with an L-shaped profile in cross-section, the angle section having a first leg region, a second leg region and an axis of rotation, the axis of rotation running in a region where the first and second leg regions connect to each other, or in a region which is adjacent to this connection, the angle section being pivotable around its axis of rotation between a locking position and a releasing position, the angle section being rigid such that the first and second leg regions remain stationary relative to each other, wherein the pivotable closure flap includes a first edge pivotally coupled to the cabin lining element and a second edge, wherein in normal operation of the aircraft, the first leg region of the angle section abuts a sub-region of an edge region of the closure flap, the edge region extending adjacent to the second edge of the closure flap, and the triggering device abuts the second leg region of the latching device.

2. The decompression device according to claim 1, wherein the triggering device includes:

a pivotable triggering element, which is pivotable between a fixing position corresponding to the fixing state and a triggering position corresponding to the triggering state, the difference between the pressure in the cabin and the pressure in a region between a rear of the cabin lining element and the aircraft outer skin, or an air flow driven by this pressure difference, acting on the triggering element, and wherein the triggering element is in such a form that when the case of decompression occurs, in particular if the pressure difference exceeds a predetermined threshold value or the air flow exceeds a predetermined threshold flow value, the triggering element pivots into the triggering position, wherein in normal operation of the aircraft, an exhaust air flow portion which flows through the first aperture is configured to flow onto at least a sub-region of the pivotable triggering element.

3. The decompression device according to claim 1, wherein when a decompression occurs, the triggering device moves out of engagement with the angle section so that the angle section can rotate out of engagement with the closure flap, thereby enabling movement of the closure flap to the releasing position.

4. The decompression device according to claim 1, wherein during normal operation of the aircraft, the abutting contact of the closure flap and the angle section prevents movement of the closure flap towards the releasing position, and the abutting contact of the angle section and the triggering device prevents movement of the angle section away from the locking position.

5. The decompression device according to claim 1, further comprising:

at least one spring element coupled to the triggering device and biasing the triggering device towards remaining in the fixing state during normal operation of the aircraft.

* * * * *